(12) United States Patent
Hoshino et al.

(10) Patent No.: US 12,470,839 B2
(45) Date of Patent: Nov. 11, 2025

(54) MOVABLE APPARATUS AND INSTALLATION METHOD FOR IMAGING DEVICE

(71) Applicant: CANON KABUSHIKI KAISHA, Tokyo (JP)

(72) Inventors: Hironobu Hoshino, Tokyo (JP); Tomoaki Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 18/472,278

(22) Filed: Sep. 22, 2023

(65) Prior Publication Data

US 2024/0114252 A1    Apr. 4, 2024

(30) Foreign Application Priority Data

Sep. 29, 2022 (JP) ................. 2022-157151

(51) Int. Cl.
*H04N 23/90* (2023.01)
*B60R 1/22* (2022.01)
*H04N 13/204* (2018.01)

(52) U.S. Cl.
CPC ............. *H04N 23/90* (2023.01); *B60R 1/22* (2022.01); *B60R 2300/107* (2013.01); *H04N 13/204* (2018.05)

(58) Field of Classification Search
CPC ....... B60R 1/26; B60R 1/22; B60R 2300/107; B60R 2300/802; B60R 2300/402;
(Continued)

(56) References Cited

U.S. PATENT DOCUMENTS

| 7,605,856 B2 | 10/2009 | Imoto |
| 10,412,308 B2 * | 9/2019 | Usui ................ H04N 23/634 |

(Continued)

FOREIGN PATENT DOCUMENTS

| JP | 2011-193485 A | 9/2011 |
| JP | 6349558 B1 | 7/2018 |

(Continued)

OTHER PUBLICATIONS

Notice of Reasons for Refusal issued by the Japanese Patent Office on Mar. 5, 2024 in corresponding JP Patent Application No. 2022-157151.

(Continued)

*Primary Examiner* — Tsion B Owens
(74) *Attorney, Agent, or Firm* — Carter, DeLuca & Farrell LLP

(57) ABSTRACT

In order to dispose an imaging device so that it can image a wide range with high resolution, a movable apparatus is configured such that a first imaging device is installed at a first installation position, the first imaging device including an optical system that forms an optical image, which has a low resolution region near an optical axis and a high resolution region outside the low resolution region, on a light receiving surface of an imaging element, and the first installation position being a position where an image is captured in at least one of a horizontal backward direction of one side surface of the movable apparatus, right or left direction in a horizontal direction ahead a driver's seat of the movable apparatus, and a downward direction ahead the movable apparatus in the high resolution region of the optical system.

14 Claims, 14 Drawing Sheets

(58) Field of Classification Search
CPC ...... H04N 23/90; H04N 23/698; H04N 7/181; H04N 23/61; H04N 5/265; H04N 23/675; H04N 23/951; H04N 23/55; H04N 13/204; G06V 20/58; G06V 10/02
See application file for complete search history.

(56) References Cited

U.S. PATENT DOCUMENTS

| | | | | |
|---|---|---|---|---|
| 10,447,948 | B2* | 10/2019 | Aihara | G02B 13/06 |
| 11,760,275 | B2* | 9/2023 | Iida | H04N 23/58 |
| | | | | 348/207.99 |
| 11,830,104 | B2* | 11/2023 | Yamashita | H04N 7/183 |
| 2020/0254941 | A1* | 8/2020 | Bao | G02B 13/0045 |
| 2021/0127086 | A1* | 4/2021 | Aihara | H04N 7/0155 |
| 2022/0080902 | A1* | 3/2022 | Yamaguchi | B60R 1/26 |
| 2022/0413604 | A1* | 12/2022 | Kim | G06T 7/70 |
| 2023/0394845 | A1 | 12/2023 | Tsuchiya | |
| 2024/0114253 | A1 | 4/2024 | Hoshino | |

FOREIGN PATENT DOCUMENTS

| | | |
|---|---|---|
| JP | 2019-158741 A | 9/2019 |
| JP | 2020-164067 A | 10/2020 |
| JP | 2022-157151 A | 10/2022 |
| WO | 2023/276819 A1 | 1/2023 |

OTHER PUBLICATIONS

Notice of Reasons for Refusal issued by the Japanese Patent Office on Aug. 6, 2024 in corresponding JP Patent Application No. 2022-157151, with English translation.

Extended European Search Report issued by the European Patent Office on Mar. 4, 2024 in corresponding EP Patent Application No. 23199068.0.

* cited by examiner

MOVABLE APPARATUS AND INSTALLATION METHOD FOR IMAGING DEVICE

BACKGROUND OF THE INVENTION

Field of the Invention

The present invention relates to a movable apparatus such as an automobile, and an installation method for an imaging device.

Description of the Related Art

In recent years, a camera monitor system (CMS) technology for replacing mirrors mounted on automobiles with electronic mirrors has been promoted. A plurality of imaging devices (cameras) installed for CMS may be installed to capture (image) images in all directions as eyes of an electronic system for securing safety.

In addition, the UN regulations UN-R46 (regulations for indirect vision for automobiles) defines a driver's blind spots, and CMS is also required to perform imaging and to be installed so as to reduce blind spots, similar to existing mirrors.

In addition, automobiles equipped with a cross traffic alert (CTA) function are respectively equipped with cameras capable of capturing images in right or left direction ahead and behind a vehicle with high resolution so as to be able to detect the approach of other vehicles crossing in front or to the backward of the vehicle.

In addition, automobiles equipped with a forward or backward monitoring device (front monitor or back monitor) are each equipped with a wide-angle camera capable of capturing an image in a wide range ahead or behind a vehicle. Japanese Patent No. 6349558 discloses that behind a vehicle is imaged with a camera including an optical system capable of imaging a portion of an imaging region with high resolution.

However, the camera with high resolution in a portion of the imaging region used in Japanese Patent No. 6349558 cannot image a wide range with high resolution, and thus, when it is necessary to image a wide range with high resolution, a large number of cameras need to be provided to cover a wide range.

SUMMARY OF THE INVENTION

In order to achieve the above-described object, a movable apparatus according to an aspect of the present invention is a movable apparatus including a first imaging device including an optical system that forms an optical image, which has a low resolution region near an optical axis and a high resolution region outside the low resolution region, on a light receiving surface of an imaging element, in which the first imaging device is installed at a first installation position where an image is captured in at least one of a horizontal backward direction of one side surface of the movable apparatus, right or left direction in a horizontal direction ahead a driver's seat of the movable apparatus, and a downward direction ahead the movable apparatus in the high resolution region of the optical system.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

First Embodiment

Figure 1:
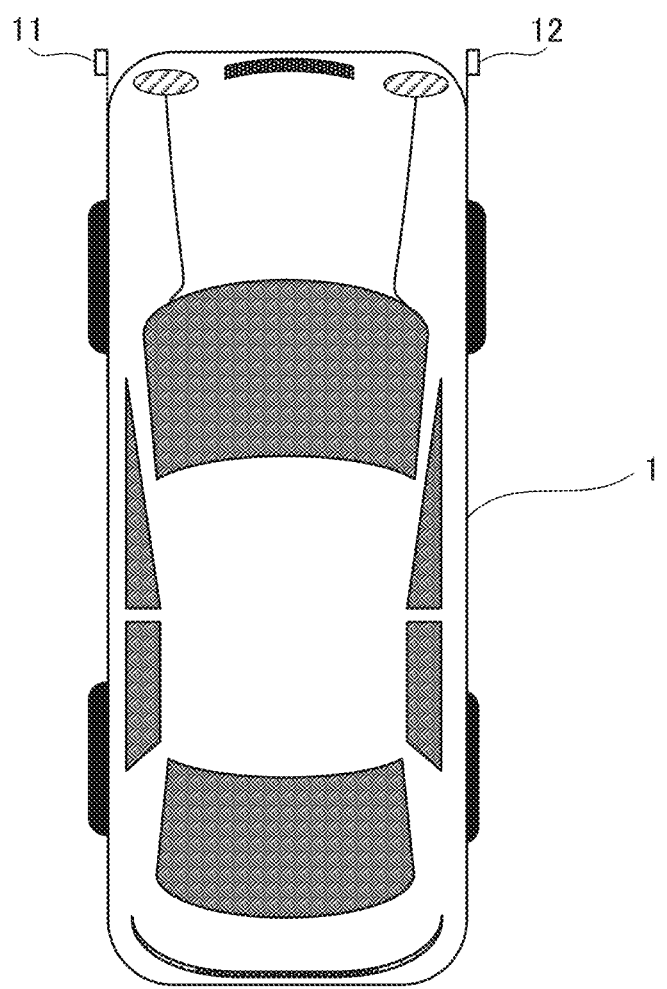
FIG. 1 is a diagram illustrating a positional relationship between a camera unit and a vehicle in a first embodiment.

In a first embodiment, an installation method for a camera unit that captures high resolution videos for an electronic side mirror and a front CTA and also captures videos for a forward monitoring device will be described. FIG. 1 is a diagram illustrating a positional relationship between a camera unit and a vehicle in the first embodiment.

FIG. 1 is a diagram illustrating an example in which a camera unit 11 as a first imaging device is installed on the front left side of a vehicle 1, which is an automobile, and a camera unit 12 is installed on the front right side. In the first embodiment, description is given on the assumption that two camera units are installed in a vehicle 1, but the number of camera units is not limited to two, and at least one or more camera units may be provided. In addition, it is sufficient that a plurality of camera units capable of capturing images in a required imaging range and high resolution imaging direction can be installed.

The camera units 11 and 12 are installed to be capable of imaging the side to the backward of the vehicle 1 from the side surfaces thereof in order to capture a video for an electronic side mirror, imaging at least one of the right and left sides of the forward direction of the vehicle 1 to be able to capture a video for a front CTA, and capturing forward and downward videos for a forward monitoring device of the vehicle 1.

Optical systems of the camera units 11 and 12 in the first embodiment generate an image circle having a characteristic that the peripheral angle of view has a higher resolution than the center in the optical axis direction, and form an image on a video element to be described later. In the first embodiment, optical characteristics of the camera units 11 and 12 are assumed to be substantially the same, and the characteristics will be exemplified using FIG. 2.

Figures 2A, 2B:
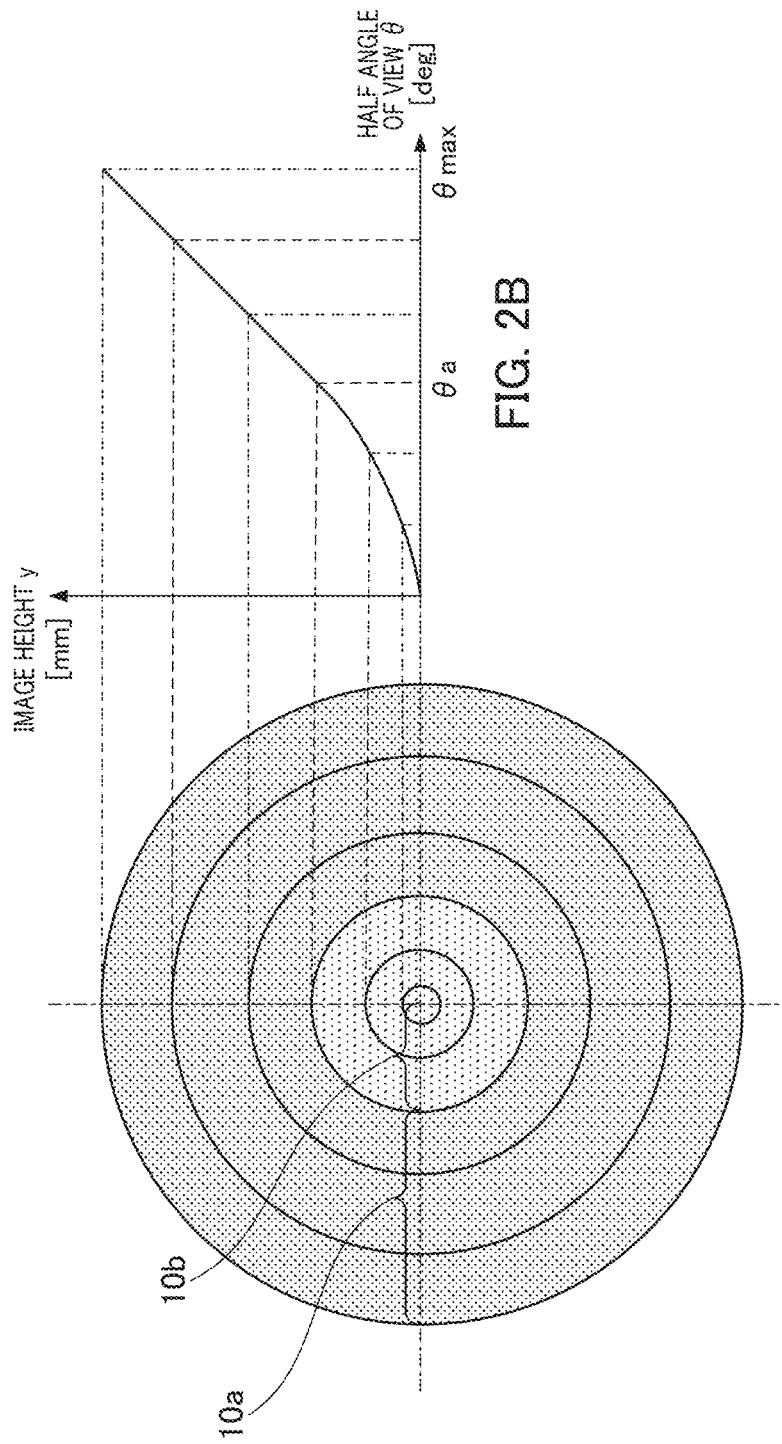
FIGS. 2A and 2B are diagrams illustrating optical characteristics of an optical system of a camera unit 11 in the first embodiment.

FIGS. 2A and 2B) are diagrams illustrating optical characteristics of the optical system of the camera unit 11 in the first embodiment. FIG. 2A is a contour line diagram illustrating an image circle of the optical system of the camera unit 11 and an image height y at each half angle of view on a light receiving surface of an imaging element.

FIG. 2B is a diagram illustrating projection characteristics of an image circle representing a relationship between an image height y of the optical system of the camera unit 11 and a half angle of view θ. In FIG. 2B, the half angle of view (an angle formed by the optical axis and an incident light beam) θ is shown as the horizontal axis, and an imaging height (image plane) y on a light receiving surface (image plane) of the imaging element of the camera unit 11 is shown as the vertical axis.

As illustrated in FIG. 2B, in the first embodiment, a configuration is adopted in which a projection characteristic y(θ) differs between a region with less than a predetermined half angle of view θa and a region with the half angle of view θa or more. When the amount of increase in the image height y with respect to the half angle of view θ per unit, that is, an index represented by a differential value dy(θ)/dθ of the projection characteristic y(θ) at the half angle of view θ is assumed to be a resolution, it can be said that the resolution increases as the inclination of the projection characteristic y(θ) in FIG. 2B becomes larger.

It can be said that the larger an interval of the image height y at each half angle of view of the contour line in FIG. 2A, the higher the resolution. In this manner, the optical system of the camera unit 11 has an optical characteristic that the half angle of view is larger than the resolution of the region with a half angle of view less than θa in the region with the half angle of view θa or more.

It is assumed that the projection characteristics y(θ) of the optical system illustrated in FIGS. 2A and 2B satisfy, for example, a condition of Equation 1, wherein f is a focal distance of the optical system.

$$0.2 < 2*f \tan(\theta \max/2)/y(\theta \max) < 0.92 \quad \text{(Equation 1)}$$

In the first embodiment, a region of a peripheral portion of the light receiving surface where a half angle of view θ is equal to or greater than θa is referred to as a high resolution region 10a, and a region of the center of the light receiving surface where a half angle of view θ is less than θa is referred to as a low resolution region 10b. In other words, the optical system in the first embodiment has a projection characteristic that an image height with respect to an angle of view per unit in the angle of view in the high resolution region is higher than that the angle of view in the low resolution region in the vicinity of the optical axis. The optical system has a low resolution region in the vicinity of the optical axis and has a high resolution region outside the low resolution region.

In the first embodiment, a boundary circle between the high resolution region 10a and the low resolution region 10b is referred to as a resolution boundary, and a boundary image on a display screen corresponding to the resolution boundary is referred to as a display resolution boundary or simply a boundary image. However, the boundary between the high resolution region 10a and the low resolution region 10b is not limited to a circular shape, and may be an ellipse having a different projection characteristic y(θ) for each radial direction, or a distorted shape.

In the first embodiment, a lens with the above-described characteristics is referred to as a stereoscopic projection lens, and a camera unit with a stereoscopic projection lens attached thereto is referred to as a stereoscopic projection camera.

In the first embodiment, it is assumed that the center of gravity of the low resolution region 10b and the center of gravity of the high resolution region 10a on the light receiving surface of the imaging element of the camera unit substantially overlap each other, and the center of gravity of the high resolution region 10a substantially matches a position where the optical axis of the optical system of the camera unit intersects the light receiving surface of the imaging element.

However, for example, the center of gravity of the light receiving surface of the imaging element and the center of gravity of the high resolution region 10a may deviate from each other in a predetermined direction, and the center of gravity of the high resolution region 10a may deviate from the position where the optical axis of the optical system intersects the light receiving surface.

Figure 3:
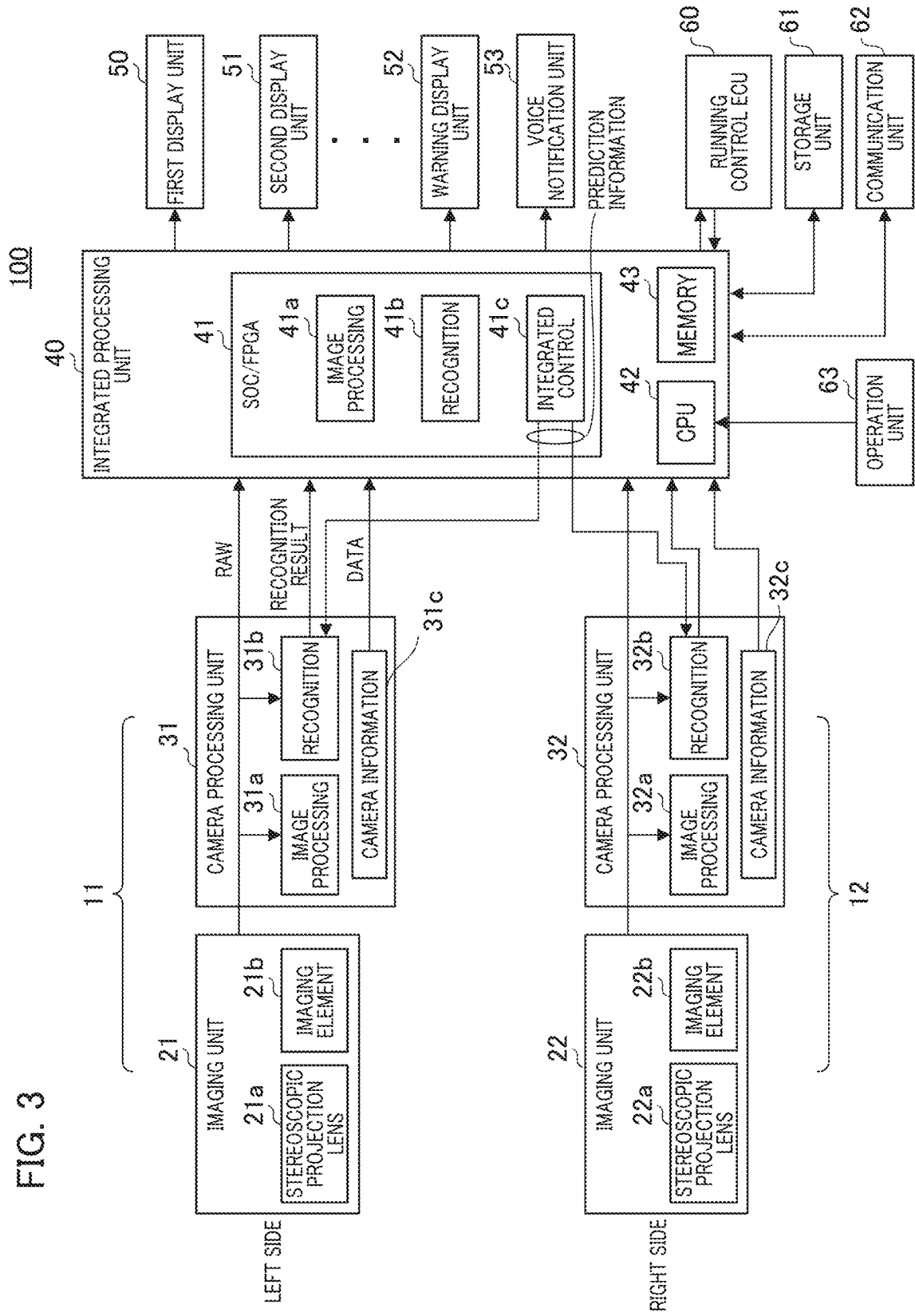
FIG. 3 is a diagram illustrating an image processing system 100 in the first embodiment.

Next, a configuration of the image processing system in the present embodiment will be described using FIG. 3. FIG. 3 is a diagram illustrating the image processing system 100 in the first embodiment, and the image processing system 100 of FIG. 3 is mounted on the vehicle 1.

The camera unit 11 includes an imaging unit 21 and a camera processing unit 31, and the camera unit 12 includes an imaging unit 22 and a camera processing unit 32. The imaging units 21 and 22 include stereoscopic projection lenses 21a and 22a and imaging elements 21b and 22b such as CMOS image sensors, respectively.

The stereoscopic projection lenses 21a and 22a, which are the optical systems of the camera units 11 and 12, are each constituted by one or more optical lenses, and each have optical characteristics as illustrated in FIGS. 2A and 2B. The stereoscopic projection lenses 21a and 22a form (image) respective optical images on the light receiving surfaces of the imaging elements 21b and 22b, respectively.

The imaging elements 21b and 22b function as imaging units, photoelectrically converting the formed optical images and outputting imaging signals. For example, R, G, and B color filters are arranged in a Bayer array for each pixel on the light receiving surfaces of the imaging elements 21b and 22b, and pixel signals of R, G, and B are sequentially output from the imaging unit 21 as imaging signals.

The camera processing units 31 and 32 have a function of processing imaging signals output from the imaging units 21 and 22, respectively. The camera processing units 31 and 32 include image processing units 31a and 32a, recognition units 31b and 32b, and camera information units 31c and 32c, respectively.

A CPU as a computer and a memory storing a computer program as a storage medium are built into each of the camera processing units 31 and 32, and the CPU executes the computer program in the memory. Thereby, with this configuration, processing in the camera processing units 31 and 32 is executed.

The camera processing units 31 and 32 are not limited to the configuration described above, and the image processing units 31*a* and 32*a* and the recognition units 31*b* and 32*b* may be constituted by hardware such as a dedicated circuit (ASIC), a processor (reconfigurable processor, DSP), or the like.

The image processing units 31*a* and 32*a* perform various image correction processing such as white balance adjustment, gain/offset adjustment, gamma processing, color matrix processing, reversible compression processing, and distortion correction processing on the imaging signals output from the imaging units 21 and 22. The image processing units 31*a* and 32*a* are configured to perform distortion correction on the image signal of the low resolution region 10*b* and not to perform distortion correction on the image signal of the high resolution region 10*a*.

Further, for example, image data input from the imaging units 21 and 22 in accordance with a Bayer array is subjected to debayer processing and converted into RGB raster type image data. A portion of the above-described image processing may be performed by other blocks of the image processing system 100 other than the image processing units 31*a* and 32*a*.

The recognition units 31*b* and 32*b* have a function of performing image recognition of a predetermined object (for example, an automobile, a person, an obstacle, or the like) from the image signals image-processed by the image processing units 31*a* and 32*a*, respectively, and outputting a first image recognition result to an integrated processing unit 40. For example, the image recognition result is transmitted to the integrated processing unit 40 as a recognition result including the type of object and a set of coordinates.

Further, the recognition units 31*b* and 32*b* may receive prediction information including the type of object and information on a moving direction of the object or priority recognition region information from an integrated control unit 41*c* of the integrated processing unit 40 and may perform image recognition processing.

The camera information units 31*c* and 32*c* function as storing units that store camera information such as characteristic information on optical image characteristics and position and orientation information of the camera units, and store the camera information of the camera units 11 and 12 in the memory in advance. The camera information units 31*c* and 32*c* may store information from various sensors provided in the camera units 11 and 12, and the like.

The stored camera information includes information such as characteristic information of the stereoscopic projection lenses 21*a* and 22*a*, the number of pixels of the imaging elements 21*b* and 22*b*, mounting position information and orientation (pitch, roll, yaw, and the like) of the camera units 11 and 12 in vehicle coordinates, an optical axis direction, and an imaging range. The camera information may also include information such as the gamma characteristics, sensitivity characteristics, a frame rate, and an image format of a video output from the camera processing unit 31.

The mounting position information of the camera unit is stored in the memory in the camera information unit in advance as relative coordinates with respect to the vehicle 1 because the mounting position with respect to the vehicle is often determined for each camera unit. The camera information may be information unique to the imaging units 21 and 22 (for example, lens aberration characteristics, noise characteristics of the imaging elements, and the like). The camera information is transmitted to the integrated processing unit 40 and is referred to when the integrated processing unit 40 performs necessary image processing or the like in order to display the camera information on a display unit.

The integrated processing unit 40 has a function of displaying video signals obtained from the camera units 11 and 12 on display devices such as a first display unit 50 and a second display unit 51, and a function of notifying a warning display unit 52 and a voice notification unit 53 of the video signals. Further, the integrated processing unit 40 has an image recognition function for an object straddling boundaries of imaging ranges of the camera units 11 and 12, and the like.

The integrated processing unit 40 includes a system on chip (SOC)/field programmable gate array (FPGA) 41, a CPU 42 as a computer, and a memory 43 as a storage medium. In the first embodiment, description is given on the assumption that the integrated processing unit 40 is accommodated in a housing separate from the camera unit.

Some or all of the functional blocks included in the integrated processing unit 40 and the like may be implemented by hardware or may be implemented by the CPU 42. As the hardware, a dedicated circuit (ASIC), a processor (reconfigurable processor, DSP), or the like can be used. The CPU 42 performs various controls of the entire image processing system 100 by executing computer programs stored in the memory 43.

The SOC/FPGA 41 includes an image processing unit 41*a*, a recognition unit 41*b*, and an integrated control unit 41*c*. The image processing unit 41*a* has a function of performing image processing such as resolution conversion for display on a display device based on the image signals and camera information acquired from the camera processing units 31 and 32.

As described above, the camera information includes optical characteristics of the stereoscopic projection lenses 21*a* and 22*a*, the number of pixels of the imaging elements 21*b* and 22*b*, photoelectric conversion characteristics, γ characteristics, sensitivity characteristics, format information of an image signal, coordinates of a mounting position and orientation information in the vehicle coordinates of the camera unit, and the like.

For example, the image processing unit 41*a* synthesizes the distortion-corrected image signal of the low resolution region 10*b* of each of the imaging units 21 and 22 and the image signal of the high resolution region 10*a* so that the image signals are smoothly connected, thereby forming an overall image for each of the imaging units 21 and 22. The image processing unit 41*a* performs image processing such as image rotation based on the camera information, particularly the arrangement position and orientation information of the camera, and transmits an image signal to the display device.

The recognition unit 41*b* performs image recognition processing on a synthesized image obtained by connecting images from the imaging units 21 and 22, and performs image recognition of a predetermined object (for example, an automobile, a person, an obstacle, or the like) in a synthesized image obtained from the imaging units 21 and 22 to generate a second image recognition result.

At that time, the recognition results (the type and coordinates of the object) obtained by the recognition units 31*b* and 32*b* may also be referred to. In the above description, the recognition unit 41*b* performs image recognition on the synthesized image obtained from the imaging units 21 and 22, but image recognition may not be necessarily performed on the synthesized image.

Description will be continued on the assumption that the recognition unit 41b can output a second image recognition result as a result of image recognition performed on an image signal in a region wider than a partial region in which image recognition is performed by the first image recognition unit among image signals acquired by an image acquisition unit.

The integrated control unit 41c functions as an integrated processing unit that outputs an image recognition result integrated based on the reliability of the first image recognition result and the reliability of the second image recognition result. For example, when the recognition result of the recognition units 31b and 32b and the recognition result of the recognition unit 41b are different from each other, the integrated control unit 41c outputs an image recognition result integrated by adopting a recognition result with higher reliability.

For example, the proportion of an object in an image recognized by the recognition units 31b and 32b is compared with the proportion of the same object recognized by the recognition unit 41b in a screen, and a recognition result with a higher proportion is determined to have high reliability and is adopted.

The integrated control unit 41c has a function of forming a video signal for displaying a desired image on the first display unit 50, the second display unit 51, or the like from an image-processed entire image for each of the imaging units 21 and 22. A frame for highlighting a recognized object, a CG for information and warnings on the type, size, position, speed, and the like of an object, and the like are generated.

Further, a CG of a boundary image for displaying a boundary may be generated based on characteristic information of the optical system such as display resolution boundary information acquired from the camera information units 31c and 32c. Then, display processing for superimposing these CG and characters on an image is performed. Here, the first display unit 50, the second display unit 51, and the like display image signals and integrated image recognition results.

Further, the integrated control unit 41c communicates with a running control unit (ECU) 60 and the like via a communication unit, which is not illustrated in the drawing, provided therein by using protocols such as CAN, FlexRay, and Ethernet.

Accordingly, display processing for appropriately changing information to be displayed based on a vehicle control signal received from the running control unit (ECU) 60 or the like is performed. That is, for example, the range of an image to be displayed on the display unit, and the like can be changed in accordance with a moving state of a vehicle which is acquired in response to the vehicle control signal.

The traveling control unit (ECU) 60 is a unit that is mounted on the vehicle 1 and includes a computer and memory for comprehensively performing drive control, direction control, and the like of the vehicle 1. From the running control unit (ECU) 60, information on the running (movement state) of the vehicle such as a running speed, a running direction, a shift lever, a shift gear, the state of a turn signal, the orientation of the vehicle obtained by a geomagnetic sensor or the like, and GPS information, and the like are input to the integrated processing unit 40 as vehicle control signals.

Further, the integrated control unit 41c may have a function of transmitting information such as the type, position, moving direction, moving speed, and the like of a predetermined object (such as an obstacle or the like) which are recognized by the recognition unit 41b to the running control unit (ECU) 60.

Thereby, the running control unit (ECU) 60 performs control necessary for avoiding obstacles such as stopping the vehicle, driving the vehicle, and changing the direction of travel. The running control unit (ECU) 60 functions as a movement control unit that controls the movement of the vehicle based on an integrated image recognition result.

The first display unit 50 is a display device that is installed, for example, near the center of an upper portion ahead a driver's seat of the vehicle 1 in the vehicle width direction with a display screen directed toward the backward of the vehicle and function as an electronic rearview mirror. The first display unit 50 may be configured to be usable as a mirror when it is not used as a display by using a half mirror or the like.

Further, the first display unit 50 includes a touch panel and operation buttons and may be configured to acquire instructions from the user and output them to the integrated control unit 41c. The first display unit 50 can also be used as an electronic side mirror for confirming obstacles or the like on the right or left, as a display device displaying a video for front CTA instead of, for example, an optical side mirror of the related art.

The first display unit 50 receives and displays a video signal generated by the integrated control unit 41c and having an angle of view required for display in accordance with the application of the first display unit.

The second display unit 51 is a display device that is installed, for example, in the vicinity of an operation panel near the center ahead the driver's seat of the vehicle 1 in the vehicle width direction and functions as a display device for displaying, for example, a region in a lower direction ahead the vehicle. Similarly to the first display unit, the second display unit 51 also functions as a display device that receives a necessary imaging region generated in accordance with the application. The integrated control unit 41c receives and displays signals necessary for display in accordance with the application of the second display unit.

For example, the second display unit can display various control signals received from a navigation system, an audio system, and the running control unit (ECU) 60. The second display unit includes a touch panel and operation buttons and may be configured to be able to acquire instructions from the user.

The second display unit 51 may be, for example, a display unit of a tablet terminal, and can also display an image by being connected to the integrated processing unit 40 in a wired manner and can also receive and display an image through a communication unit 62 in a wireless manner. A liquid crystal display, an organic EL display, or the like can be used as display elements of the first display unit 50 and the second display unit 51, and the number of display units is not limited to one.

The integrated control unit 41c determines whether a moving object is included in an image based on recognition results output by the recognition units 31b and 32b and the recognition unit 41b, and outputs the recognition results. Here, the moving object here is, for example, a bicycle, a pedestrian, and other vehicles, and are referred to as a detection target in the first embodiment. The recognition results output by the integrated control unit 41c include whether there is a detection target, the type and coordinates of a detection target, and speed information.

Based on the recognition result output from the integrated control unit 41c, the warning display unit 52 issues, for example, a side collision warning to the driver by using visual information. The warning display unit 52 may be constituted by, for example, an LED, and may be configured to perform lighting or blinking when the recognition result includes information indicating that there is a detection target.

The warning display unit 52 may be constituted by a display such as a liquid crystal. In this case, when the recognition result includes information indicating that there is a detection target, an icon, character information, or the like is output to the display. Further, the warning display unit 52 can be installed, for example, in the vicinity of an end ahead the driver's seat of the vehicle 1 in the vehicle width direction with the display screen directed toward the driver.

The warning display unit 52 may be installed, for example, near the first display unit 50 and the second display unit 51, or may be configured to be replaced with the first display unit 50 and the second display unit 51. The voice notification unit 53 outputs a sound based on the recognition result output from the integrated control unit 41c. For example, the driver can be notified of a sound by outputting the sound using a speaker. It is desirable to install, for example, the voice notification unit 53 near an end ahead the driver's seat of the vehicle 1 in the vehicle width direction.

The integrated control unit 41c also functions as a warning condition determination unit and performs control so that the content of a warning output by the warning display unit 52 or the voice notification unit 53 is changed based on the coordinates and speed of the detection target obtained by the recognition units 31b to 32b and the recognition unit 41b. The integrated control unit 41c may be configured to control the warning display unit 52 so that the smaller a distance to the detection target is, the higher the degree of warning is.

For example, it is desirable to control the voice notification unit 53 so that the smaller a distance to the detection target at the side of the vehicle is, the larger the sound volume of a notification is. The integrated control unit 41c may be configured to determine whether the running speed of the host vehicle which is input from the running control unit (ECU) 60 is equal to or less than a predetermined value, and to display a warning on the warning display unit 52 or give a warning notification by the voice notification unit 53 only when the running speed is the predetermined value or less.

When the running speed of the host vehicle is high, there is a possibility that the detection target cannot be correctly recognized. Thus, with such a configuration, the possibility of performing correct side detection can be improved. At this time, it is desirable to set the predetermined value of the running speed of the host vehicle to 30 km/hkm/h.

When the detection target is moving compared to when it is stopped, there is a stronger possibility of the detection target colliding with the vehicle. Thus, the integrated control unit 41c may be configured to determine whether the speed of the detection target is within a predetermined range, and to display a warning on the warning display unit 52 or give a warning notification by the voice notification unit 53 only when it is determined that the speed of the detection target is within the predetermined range. In this case, it is desirable to set a predetermined range of the speed of a predetermined detection target to 5 km/h or more and 20 km/h or less.

Further, the integrated control unit 41c determines whether the vehicle is turning right or left based on moving direction information of the host vehicle which is output from the running control unit (ECU) 60, and displays a warning on the warning display unit 52 or give a warning notification by the voice notification unit 53 only when the vehicle is turning right or left.

Although the integrated processing unit 40 is mounted on the vehicle 1 in the first embodiment, some of the processing of the image processing unit 41a, the recognition unit 41b, and the integrated control unit 41c of the integrated processing unit 40 may be performed by an external server or the like via, for example, a network.

In this case, for example, the imaging units 21 to 24 as image acquisition units are mounted on the vehicle 1, but for example, some of the functions of the camera processing units 31 and 32 and the integrated processing unit 40 can be processed by an external server or the like. In addition, it is possible to make the running control unit (ECU) 60 have some or all of the functions of the integrated processing unit 40.

Reference numeral 61 denotes a storage unit, and the entire image for each of the imaging units 21 and 22 which is generated by the integrated processing unit 40 is recorded. Further, a CG such as a predetermined frame, characters, and a warning indicating a recognized object, and images having the CG superimposed thereon and displayed on the first display unit 50, the second display unit 51, and the like are recorded together with time, GPS information, and the like. The integrated processing unit 40 can also reproduce past information recorded in the storage unit 61 and display it on the first display unit 50 and the second display unit 51.

The communication unit 62, which is a unit for communicating with an external server or the like via a network, can transmit information before being recorded in the storage unit 61 and past running history information and the like recorded in the storage unit 61 to an external server or the like and store them in the external server or the like.

As described above, an image can be transmitted to an external tablet terminal or the like and displayed on the second display unit 51, which is a display unit of the tablet terminal. Traffic congestion information and various types of information can be acquired from an external server or the like and displayed on the first display unit 50 and the second display unit 51 via the integrated processing unit 40.

Reference numeral 63 denotes an operation unit for inputting various instructions to the image processing system by a user's operation. The operation unit includes, for example, a touch panel, operation buttons, and the like.

Figure 4A:
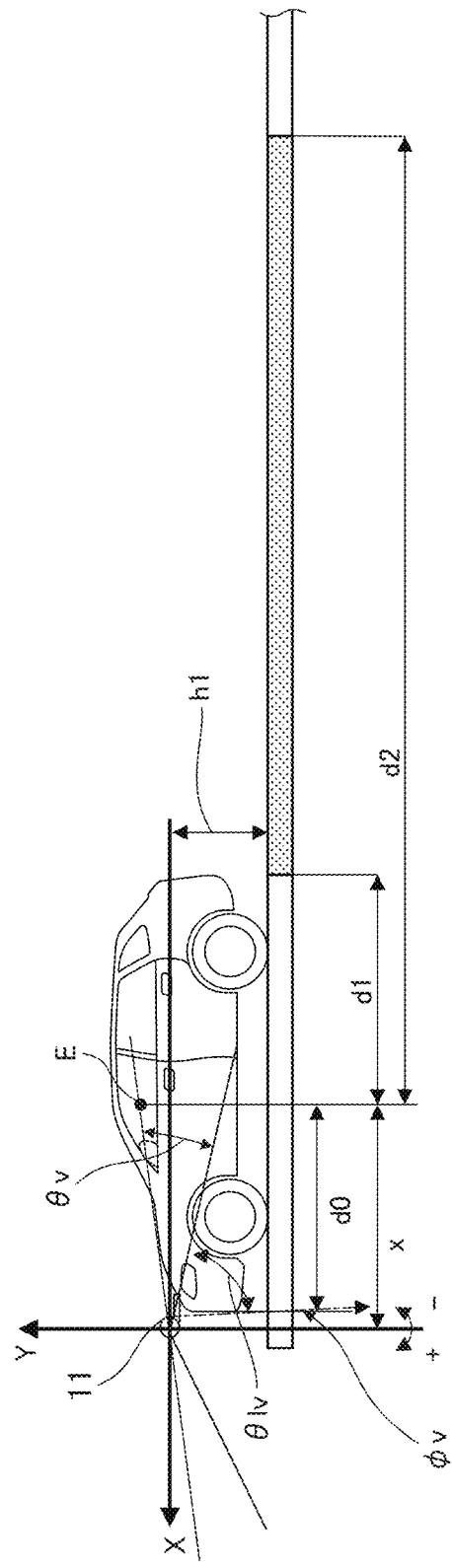
FIGS. 4A and 4B are diagrams illustrating a relationship between characteristics of the optical system of the camera unit 11 installed in a vehicle 1 in the first embodiment and an imaging region required for displaying an electronic side mirror and a front CTA.
Figure 4B:
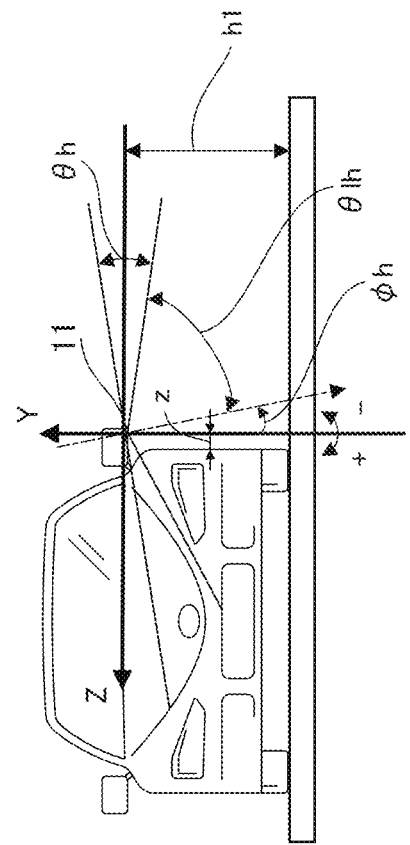

Next, a relationship between characteristics and arrangement of the camera unit 11 installed on the left front side and the camera unit 12 installed on the right front side will be described. FIGS. 4A and 4B are diagrams illustrating a relationship between characteristics of the optical system of the camera unit 11 installed in the vehicle 1 in the first embodiment and an imaging region required for display for an electronic side mirror and a front CTA. FIG. 4A is a side view of the vehicle 1 when viewed from the side, and FIG. 4B is a front view of the vehicle when viewed from the front.

The origin of the X, Y, and Z directions in FIG. 4 is the installation position of the camera unit 11, and the X direction is a forward direction of the vehicle in the horizontal direction as illustrated in FIG. 4A. The Z direction is a left direction in the horizontal direction when facing the vehicle 1 as illustrated in FIG. 4B. The Y direction is an upward direction in the vertical direction as illustrated in FIGS. 4A and 4B.

In the XY plane in FIG. 4A, a positive angle is set in the X direction and a negative angle is set in the −X direction with reference to the vertical direction. In the YZ plane in FIG. 4B, a positive angle is set in the Z direction and a negative angle is set in the −Z direction with reference to the vertical direction. E in the XY plane in FIG. 4A represents the driver's viewpoint position, which is the eye position of the driver at a seated position or the center position on the driver's seat surface.

A relationship between the optical axis of the camera unit 11 and an imaging angle of view will be described using the above-described definition. $\varphi v$, $\theta v$, and $\theta l v$ in the XY plane in FIG. 4A will be described. $\varphi v$ is the optical axis direction of the camera unit 11 and is an angle from the vertical direction. In the first embodiment, the optical axis of the imaging device is directed downward from an installation position.

$\theta v$ is an angle of view of the high resolution region 10a of the camera unit 11. $\theta l v$ is an angle of view of the low resolution region 10b of the camera unit 11.

$\varphi h$, $\theta h$, and $\theta l h$ in the YZ plane in FIG. 4B will be described. $\varphi h$ is the optical axis direction of the camera unit 11 and is an angle from the vertical direction. $\theta h$ is an angle of view of the high resolution region 10a of the camera unit 11. $\theta l h$ is an angle of view of the low resolution region 10b of the camera unit 11.

A positional relationship of the camera unit 11 will be described using the above-described definition. x in the XY plane in FIG. 4A is a horizontal distance between the camera unit 11 and a viewpoint position E of the driver. h1 is a vertical distance between the camera unit 11 and the ground.

z in the YZ plane in FIG. 4B is a distance between the installation position (first installation position) of the camera unit 11 and the side surface of the vehicle 1. Here, an imaging region (specified region behind the vehicle side surface) required for display of an electronic side mirror will be described with reference to FIGS. 4 and 5.

Figure 5:
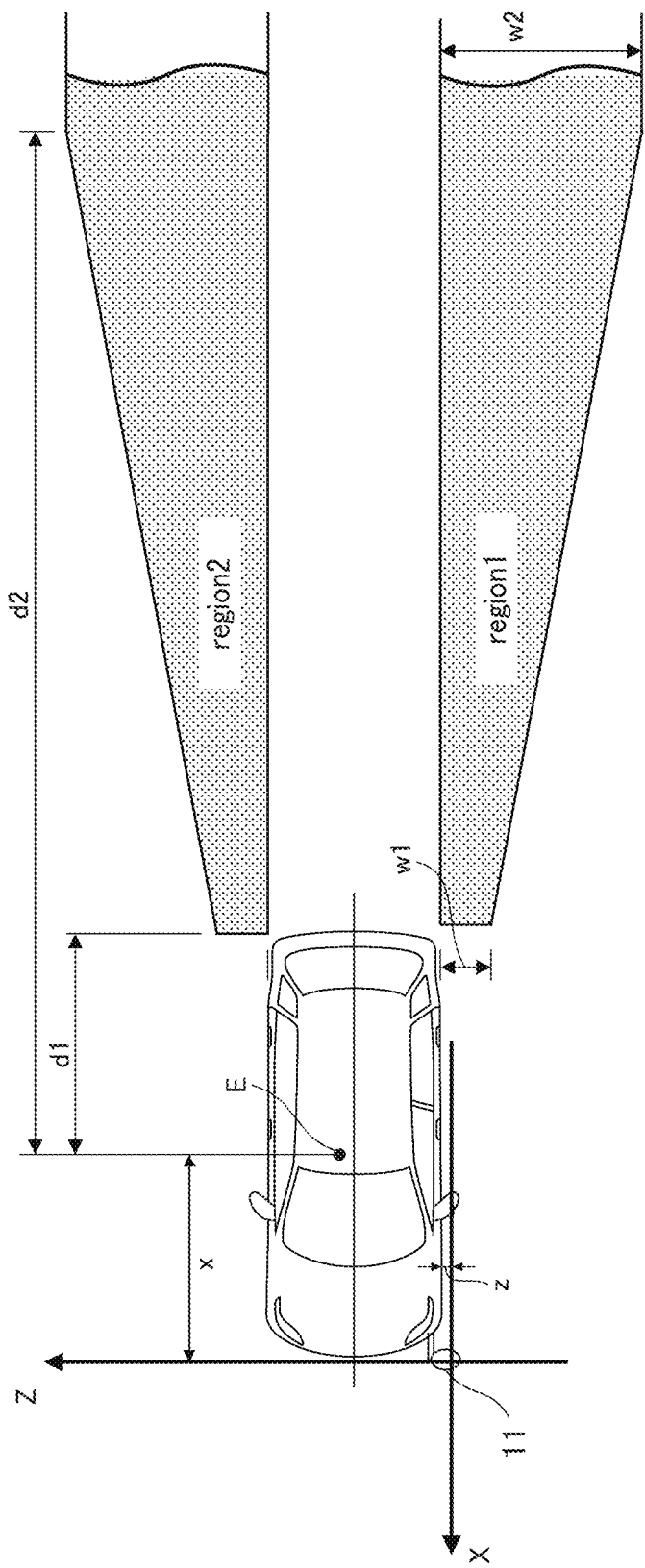
FIG. 5 is a plan view of the vehicle 1 of the first embodiment when viewed from above.

FIG. 5 is a top plan view of the vehicle 1 in the first embodiment, and the X and Z directions correspond to those in FIG. 4 with the installation position of the camera unit 11 as the origin. Specified regions behind the vehicle side surfaces are regions on the ground as indicated by hatching in FIG. 4A and FIG. 5, and are regions that need to be confirmed by the driver with the side mirror of the vehicle.

The specified regions behind the vehicle side surfaces are regions on the ground surface defined by a width w1 from the side surface of the vehicle body at a distance d1 from the driver's viewpoint position E to the backward side and a width w2 from the side surface of the vehicle body at a distance d2, and a region on the passenger seat side is assumed to be region1, and a region on the driver's seat side is assumed to be region2. Here, region1 and region2 have shapes line-symmetrical to the longitudinal centerline of the vehicle 1.

Installation conditions under which the camera unit 11 installed on the side of the passenger seat can capture an image in the horizontal direction with high resolution while imaging the specified region region1 behind the vehicle side surface will be described. Since a distant region of region1, which is a specified region behind the vehicle side surface, extends to infinity behind the vehicle, the camera unit 11 is installed to be able to capture an image of infinity, that is, the width w2 in the horizontal direction. In order to confirm a distant object away from the driver with a video captured by the camera, it is desirable to install the camera so that it can capture images with high resolution from the nearby ground direction to the horizontal direction.

Thus, in the first embodiment, the camera is installed to satisfy the following installation conditions (Equation 2) so that a horizontal angle)(−90° is included in the high resolution region 10a ($\varphi v - \theta v - \theta l v$) and the range of (angle of $\varphi v - \theta l v$) of the camera unit 11.

$$\varphi v - \theta v - \theta l v < -90° < \varphi v - \theta l v \quad \text{(Equation 2)}$$

A tip region (region of the width w1) in the moving direction of the specified region region1 at a position separated backward by d1 from the viewpoint position E in addition to Equation 2 is installed to be included in an imaging angle of view so that the specified region region1 on the side surface of the vehicle is included in an imaging angle of view of the camera unit 11.

That is, the camera unit is installed to satisfy the following condition (Equation 3) that an angle ($-A \tan((x+d1)/h)$) in the direction of the tip region of region1, which is separated backward by d1 from the viewpoint position E, is included in the angle of view ($\varphi v - \theta v - \theta l v$) to ($\varphi v + \theta v + \theta l v$) of the camera unit 11.

$$\varphi v - \theta v - \theta l v \leq -A \tan((x+d1)/h1) \leq \varphi v + \theta v + \theta l v \quad \text{(Equation 3)}$$

By installing the camera unit 11 so as to satisfy the installation condition (first condition) of the above-described Equations 2 and 3, the camera unit 11 can capture an image in the horizontal direction with high resolution while imaging the specified region region1 behind one side surface of the vehicle 1. Here, one side surface of the vehicle 1 is the side surface on the side of the passenger seat.

Next, the installation conditions under which the camera unit 11 can capture an image in the horizontal direction with high resolution for display for a front CTA will be described. It is desirable that the display for the front CTA be displayed so that an object approaching from a distant region in the right or the left direction can be confirmed at an intersection with poor visibility. Thus, in the first embodiment, the camera unit 11 is installed so that the right or left of a horizontal directions ahead of the driver's viewpoint position E can be appropriately confirmed.

In other words, a distant region in the right or the left in the horizontal direction extends to infinity, and thus the camera unit is installed to be able to image nearby objects and far objects in the horizontal direction with high resolution. Here, an example of an installation condition (Equations 4 and 5) as a second condition under which the camera unit 11 can capture images in at least one of the right and left in the horizontal direction ahead of the driver's viewpoint position E (driver's seat) will be described.

In the first embodiment, when the camera unit 11 is ahead the viewpoint position E ($x \geq 0$), the camera unit 11 is installed to satisfy Equation 4 or Equation 5 as the following installation condition (second condition). That is, the high resolution regions 10a in the right or the left direction (($\varphi h - \theta h - \theta l h$) to ($\varphi h - \theta l h$) in the right direction when facing the front of the vehicle, and ($\varphi h + \theta l h$) to ($\varphi h + \theta h + \theta l h$) in the left direction when facing the front of the vehicle) includes the right or the left horizontal direction.

$$\varphi h - \theta h - \theta l h \leq -90° \leq \varphi h - \theta l h \quad \text{(Equation 4)}$$

$$\varphi h + \theta l h \leq 90° \leq \varphi h + \theta h + \theta l h \quad \text{(Equation 5)}$$

When the camera unit 11 is behind the viewpoint position E ($x < 0$), it is desirable that the camera unit 11 be installed such that a horizontal region ahead the viewpoint position E is included in a high resolution region. By installing the camera unit 11 in this manner, the camera unit 11 can image either one of the side surfaces of the vehicle in the horizontal direction with high resolution.

It is desirable that the camera unit 11 be disposed at a position where the vehicle 1 is not imaged centering on the optical axis in order to image the front surface of the vehicle in the right or the left direction and to image the backward of the side surface of the vehicle. For example, it is desirable that an offset x of the camera unit be larger than a distance d0 from the viewpoint position E to the front tip end of the vehicle 1 in order to image the front side of the vehicle in the right or the left direction.

Further, in order to image the backward of the vehicle side surface, it is desirable that an offset z of the camera unit 11 be installed outside the side of the vehicle 1 (−Z direction in FIG. 4).

By satisfying the first condition of Equations 2 and 3 and the second condition of Equations 4 and 5 in this manner, either the backward of the side surface and the right or the left direction of the vehicle 1 can be included in an imaging angle of view. Further, in order to include a region below the front of the vehicle within the imaging angle of view, it is desirable that the optical axis be directed toward the ground in addition to the conditions of Equations 2 and 3 and Equations 4 and 5 described above.

Figure 6:
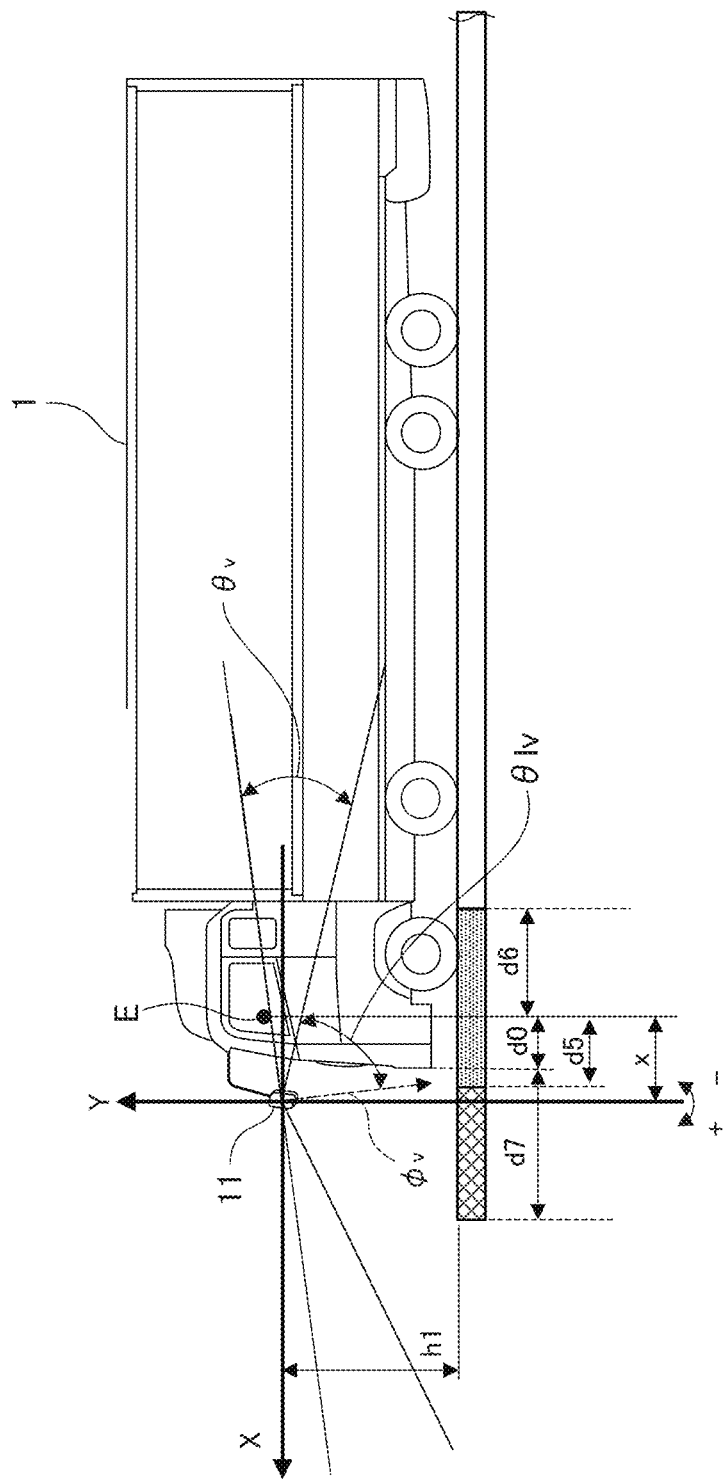
FIG. 6 is a side view of the vehicle 1 of the first embodiment when viewed from the side.

An imaging region (a specified region below the front surface of the vehicle) necessary for forward lower display used for a forward monitoring device will be described with reference to FIGS. 6 to 8. FIG. 6 is a side view of the vehicle 1 when viewed from the side in the first embodiment.

Figure 7:
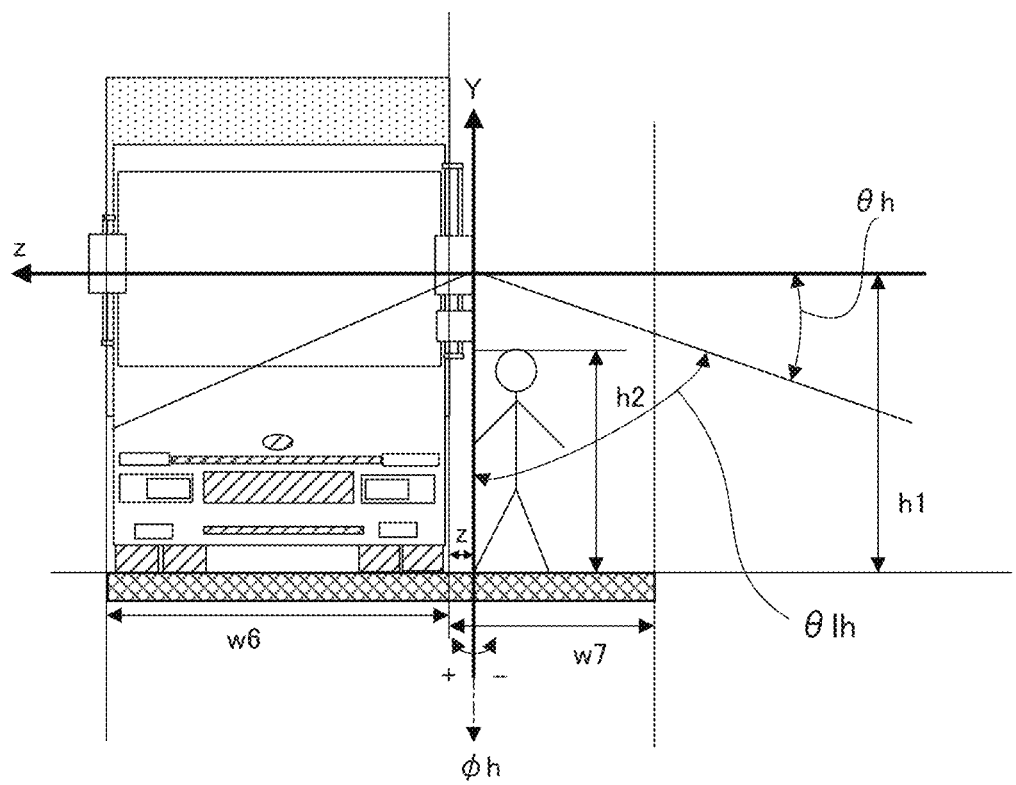
FIG. 7 is a front view of the vehicle 1 when viewed from the front, the front view illustrating a relationship between the camera unit 11 and the vehicle 1 in the first embodiment.
Figure 8:
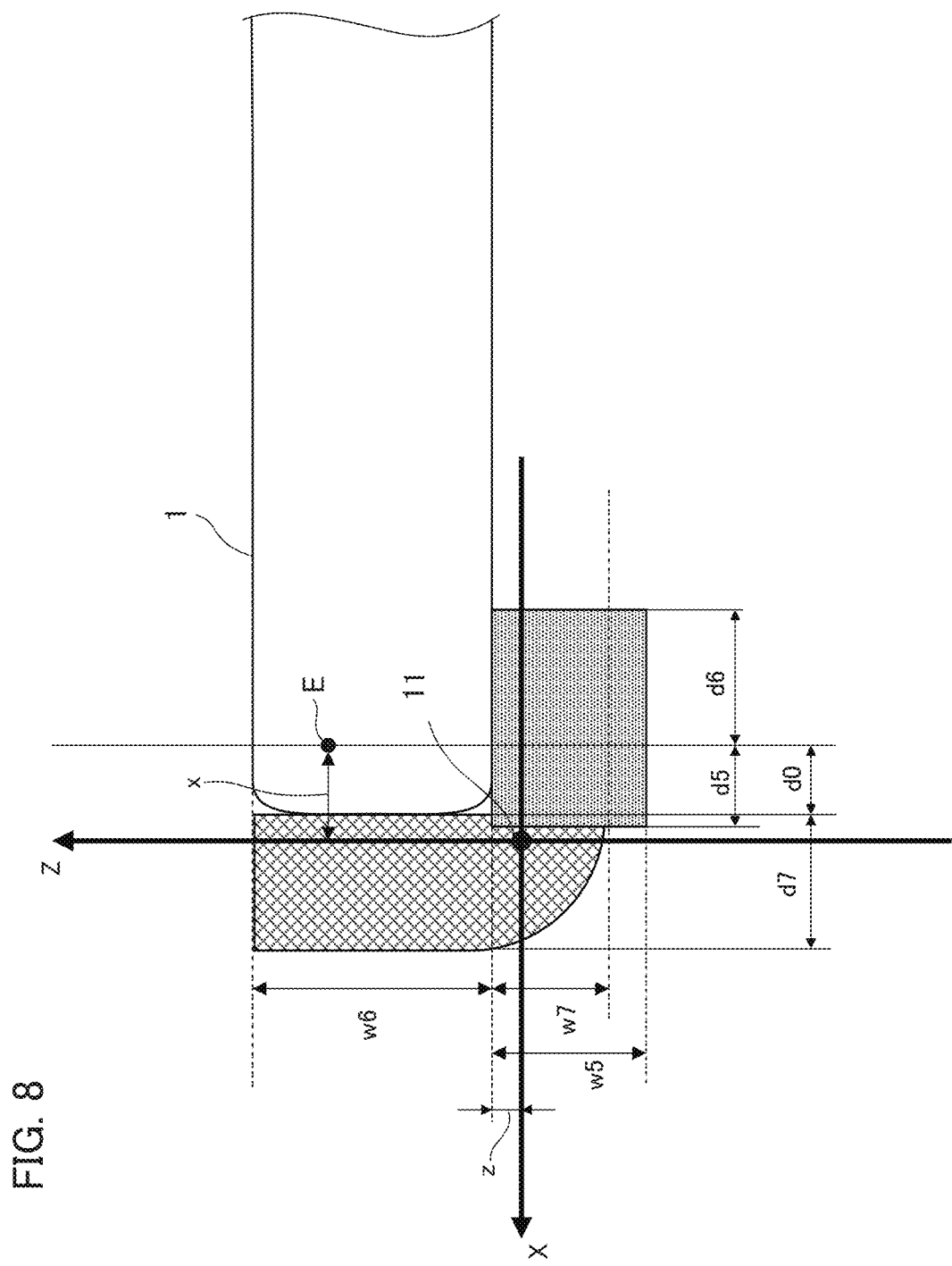
FIG. 8 is a plan view of the vehicle 1 when viewed from above, the plan view illustrating a specified region below a front surface of a vehicle in the first embodiment.

FIG. 7 is a front view of the vehicle 1 when viewed from the front, the front view illustrating a relationship between the camera unit 11 and the vehicle 1 in the first embodiment, and FIG. 8 is a plan view of the vehicle 8 when viewed from above, the plan view illustrating a specified region below the front surface of the vehicle in the first embodiment. The X, Y, and Z directions and angles in FIGS. 6 to 8 correspond to those in FIGS. 4A and 4B and FIG. 5, respectively, and have the same relationship.

E in FIGS. 6 and 8 represents a viewpoint position of a driver, and a positional relationship (x, h1, z) between the camera unit 11 and the vehicle 1 and a relationship between the optical axis and an imaging angle of view ($\varphi v$, $\theta v$, $\theta lv$, $\varphi h$, $\theta h$, $\theta lh$) in FIGS. 6 and 7 have the same relationships as those in FIGS. 4A and 4B. Here, a specified region below the front surface of the vehicle will be described using FIGS. 6 to 8.

The specified region below the front surface of the vehicle is a region that needs to be confirmed by the driver using a side under mirror of the vehicle. Here, d7 is a distance from the tip end of the vehicle 1 to a distant front lower region to be confirmed, d0 is a distance from the viewpoint position E to the tip end of the vehicle 1, w6 is the vehicle width of the vehicle 1, and w7 is a distance to a distant region at the side of the vehicle to be confirmed.

That is, the specified region below the front surface of the vehicle is a region represented by a region on the ground surrounded by d7 and (w6+w7). Thus, an installation condition under which the camera unit 11 can image a specified region in a downward direction ahead the vehicle 1 is a condition under which the region surrounded by d7 and (w6+w7) is included in the imaging angle of view of the camera unit 11 (third condition).

Thus, in the first embodiment, the camera unit is installed to satisfy the installation condition as the third condition (Equations 6 and 7) so that an angle of view of a front end of d7 is included in the imaging angle of view of the camera unit 11 ($\varphi v - \theta v - \theta lv$) to ($\varphi v + \theta v + \theta lv$).

$\varphi v - \theta v - \theta lv \leq -A\tan((x-d0)/h1) \leq \varphi v + \theta v + \theta lv$ (Equation 6)

$\varphi v - \theta v - \theta lv \leq A\tan((d0+d7-x)/h1) \leq \varphi v + \theta v + \theta lv$ (Equation 7)

In addition, the camera unit 11 is installed to satisfy the installation condition (Equations 8 and 9) so that the ends of w6 and w7 are included in the range of (w6+w7) within the imaging angle of view of the camera unit 11.

$\varphi h - \theta h - \theta lh \leq -A\tan((w6+z)/h1) \leq \varphi h + \theta h + \theta lh$ (Equation 8)

$\varphi h - \theta h - \theta lh \leq A\tan((w7-z)/h1) \leq \varphi h + \theta h + \theta lh$ (Equation 9)

In the first embodiment, by installing the imaging device by such an installation method, the camera unit 11 can realize a movable apparatus capable of imaging a wide range of a predetermined specified region below the front of the vehicle with high resolution. In the first embodiment, all of the first, second, and third conditions described above may not be satisfied, and installing the camera unit to satisfy at least one of the first to third conditions described above is included.

Figure 9:
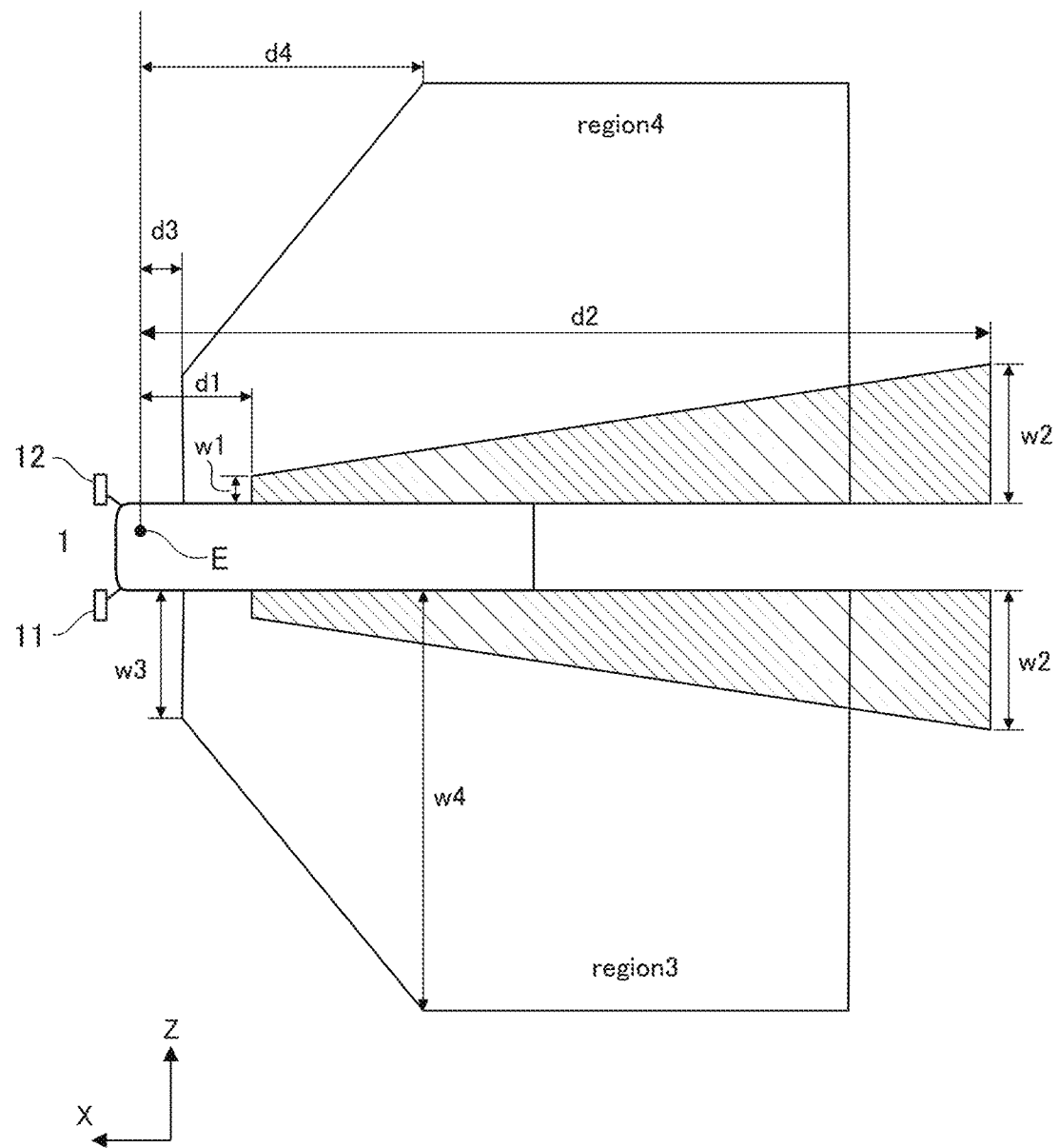
FIG. 9 is a plan view of the vehicle 1 when viewed from above, the plan view illustrating specified regions behind the vehicle side surfaces in the first embodiment.

In addition, for large-sized vehicles, it is possible to confirm the field of view in a wider range than the specified region behind the vehicle side surface (a specified wide region behind the vehicle side surface). The specified side region behind the vehicle side surface will be described with reference to FIG. 9. FIG. 9 is a plan view of the vehicle 1 when viewed from above, the plan view illustrating a specified region behind the vehicle side surface in the first embodiment. Regions on the ground on the sides and backward of the vehicle indicated by oblique lines in FIG. 9 are the same as the specified regions behind the vehicle side surfaces described in FIG. 5.

The specified wide regions behind the vehicle side surfaces are set to be regions (region3, region4) on the ground surface which are defined by a width W3 from the side surface of the vehicle body at a distance d3 from the driver's viewpoint position E to the backward and a width w4 from the side surface of the vehicle body at a distance d4 from the driver's viewpoint position E to the backward. The camera unit 11 disposed on the side of the passenger seat can cope with installation conditions for large-sized vehicles by being installed so that the specified wide region region3 behind the vehicle side surface is included in the imaging range.

Particularly, in a large-sized vehicle, it is necessary to detect a moving object on the side of the passenger seat of the vehicle and image a detection region for a side collision warning to be given to a driver when there is a possibility of collision. The detection region is a region where there is a high possibility of trapping or a collision in a case where there is an object in the detection region, for example, when the host vehicle is turning left.

The camera unit 11 disposed on the side of the passenger seat is installed such that the detection region is included in the imaging range, and thus it is also possible to meet the installation conditions for detecting a moving object on the side of the passenger seat.

Figure 10:
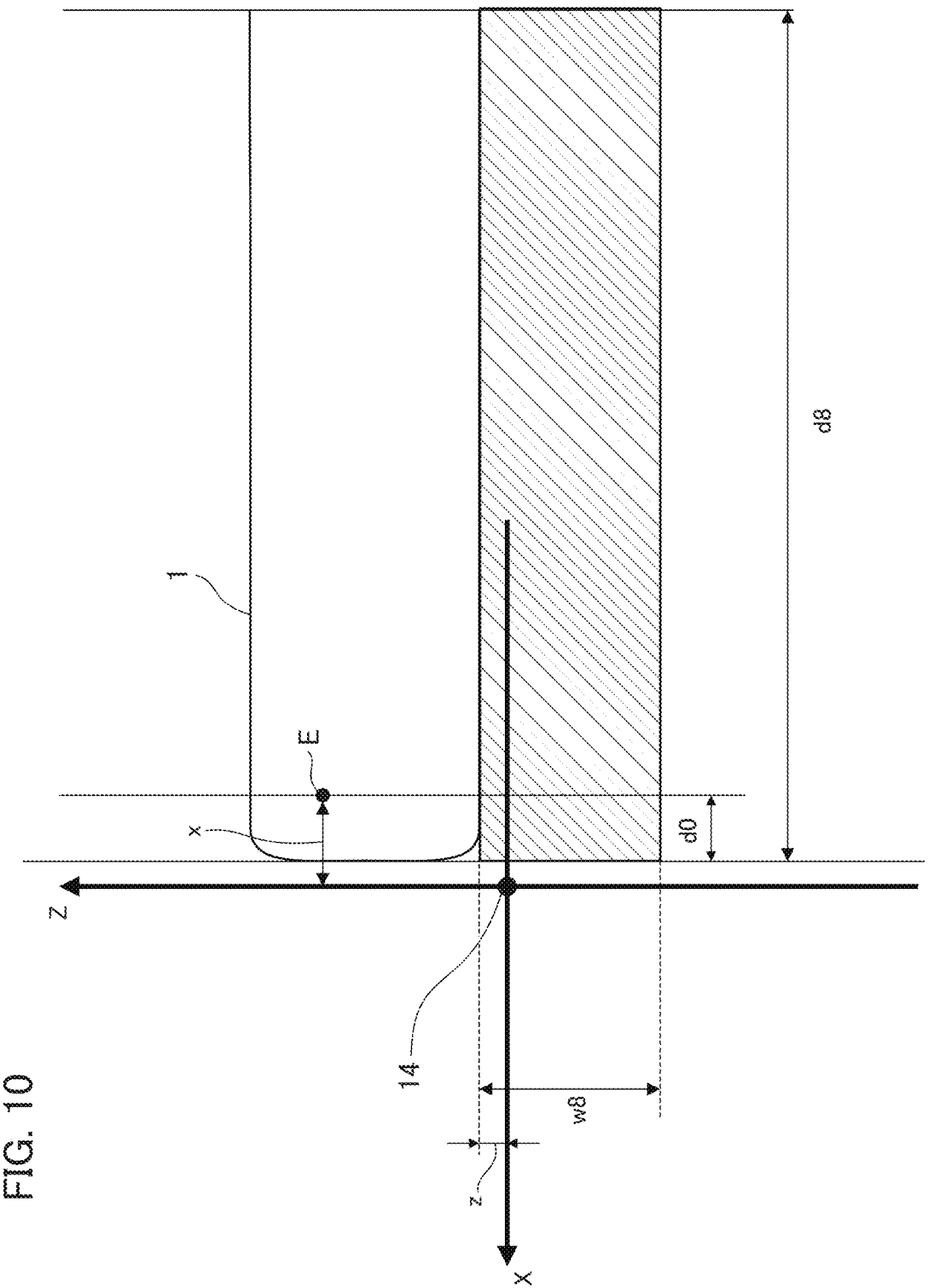
FIG. 10 is a schematic plan view of the vehicle 1 when viewed from above, the plan view illustrating a specified region of the side surface of a passenger seat of the vehicle in the first embodiment.

A relationship between the specified region on the side of the passenger seat of the vehicle, the detection region, and the object will be described using FIGS. 10 and 11. FIG. 10 is a schematic plan view of the vehicle 1 when viewed from above in order to describe the specified region on the side of the passenger seat of the vehicle in the first embodiment.

Figure 11:
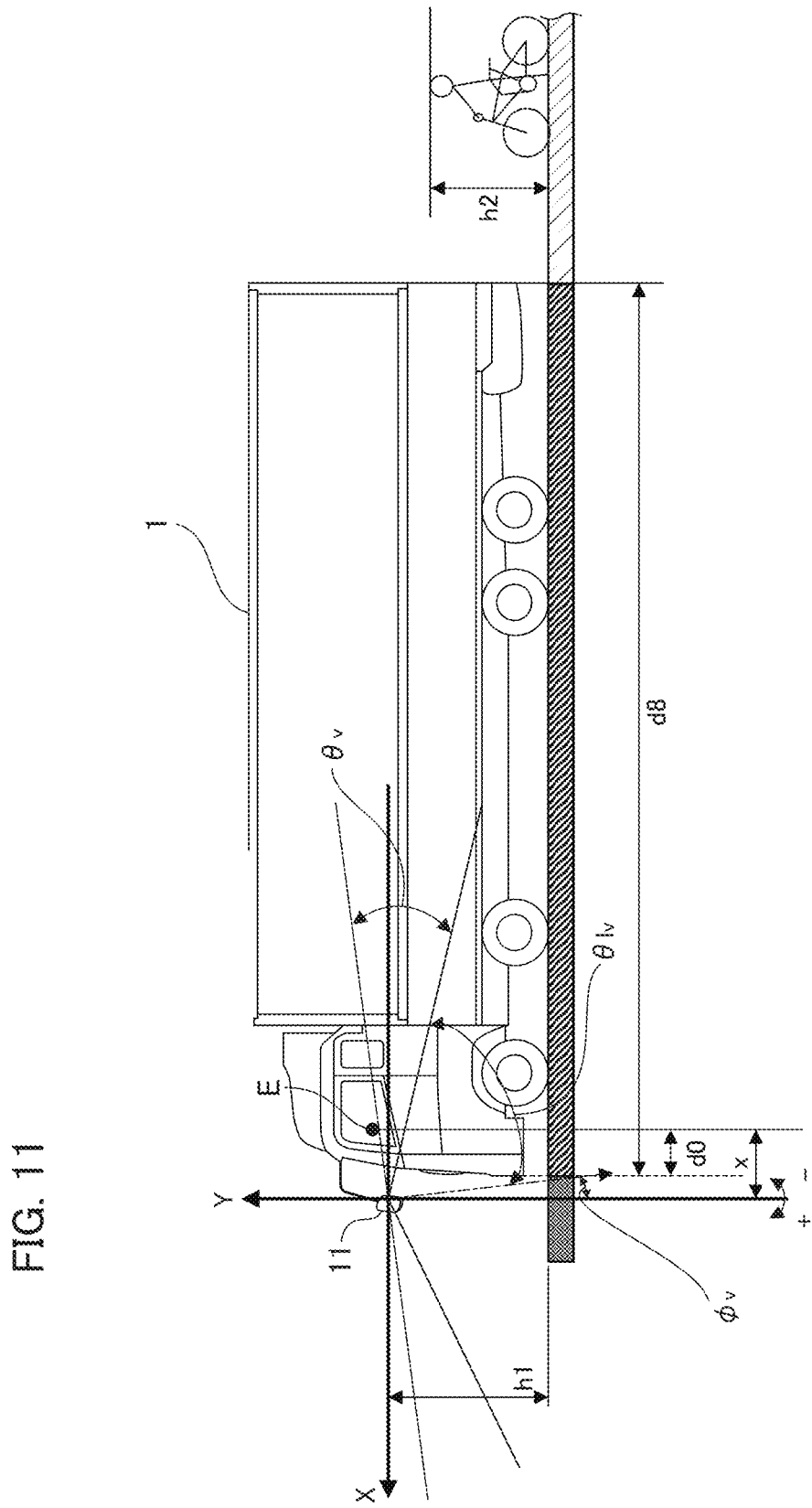
FIG. 11 is a side view of the vehicle 1 when viewed from the side in the first embodiment.

FIG. 11 is a side view of the vehicle 1 when viewed from the side in the first embodiment. The X, Y, Z directions and angles in FIGS. 10 and 11 have the same relationship as in FIGS. 6 to 8. E illustrated in FIGS. 10 and 11 is the same as E illustrated in FIGS. 6 to 8, and represents the driver's viewpoint position.

As illustrated in FIG. 10, a specified region on the side surface on the side of the passenger seat of the vehicle is a region surrounded by a distance d8 from the front surface of the vehicle body to the backward side of the vehicle body where it is necessary to perform detection, and a distance w8 from the side surface of the vehicle body to a distant region at the side of the vehicle body where it is necessary to perform detection. A moving object having a size that needs to be detected is an object having a height h2. Thus, a detection region for a side collision warning is a region surrounded by the specified region on the side surface on the side of the passenger seat of the vehicle and the height h2.

The camera unit 11 is installed such that the detection region for the side collision warning is included in the angle of view, and thus it is also possible to cope with installation conditions for large-sized vehicles. The height h1 of the camera unit 11 is preferably higher than the height h2 of the moving object to be detected. That is, it is desirable to satisfy the condition of the following Equation 10.

$$h1 \geq h2 \quad \text{(Equation 10)}$$

With such installation conditions, the moving object having a height h2 can be included in the imaging range without widening the imaging angle of view of the camera unit as compared with the case of the condition of h1≤h2. For example, when a bicycle is included in detection targets, it is desirable to set h2 to 1.7 meters.

When a pedestrian is included in detection targets, it is desirable to set h2 to 2 meters. When an offset x of the camera unit is larger than the front end of the vehicle, it is necessary to include the entire ground in the region with a width w8 at that position in the imaging range in order to image the detection target within the detection region.

The installation conditions for the camera unit 11 have been described above. It is desirable that the camera unit 11 be disposed diagonally ahead and outside the corner of the vehicle body on the side of the passenger seat in order to capture images with high resolution in a plurality of required imaging ranges and high resolution imaging directions using a smaller number of cameras.

The installation conditions for the camera unit 11 on the side of the passenger seat have been described. However, the camera unit 12 disposed on the driver's seat side is also installed under similar installation conditions, and thus images can be captured in a plurality of required imaging ranges and high resolution imaging directions with high resolution using a smaller number of cameras. It is desirable that the camera unit 12 be disposed diagonally ahead and outside the corner of the vehicle body on the driver's seat side.

Hereinafter, the camera unit 11 installed ahead the passenger seat will be described with actual specific values. For example, description will be given of a case where a vehicle is a passenger car with nine passengers or less or a small freight car (for example, a vehicle weight is 3.5 tons or less) and d0=0.8 m.

In UN-R46, specified regions behind the vehicle side surfaces are defined as d1=4 m, d2=20 m, w1=1 m, and w2=4 m. In UN-R46, a specified region below the vehicle front surface is defined as d7=0.3 m, w6=1.8 m, and w7=0.3 m. In addition, d7=2.3 m, d8=4.8 m, and w8=0.3 are defined in the safety standards established by the Ministry of Land, Infrastructure, Transport and Tourism (ground region as specified in Article 27 of Article 21 (driver's seat) of the Road Transport Vehicle Safety Standards and Attachment 29).

It is desirable that the driver be able to confirm these specified regions visually or using a mirror or a display device. A specific example in a case where the camera unit 11 in the first embodiment includes these ground regions in an imaging region will be described.

For example, a case is assumed in which a camera unit having a vertical angle of view θv and a horizontal angle of view θh being 30.0 degrees, and a vertical angle of view θlv and a horizontal angle of view θlh being 60 degrees in the high resolution region 10a is installed at a position where x=0.8 m, z=0.3 m, and h=1.2 m. In this case, it is only required that the camera unit is installed such that an angle φv in the vertical direction and an angle φh in the horizontal direction of the optical axis of the camera unit are respectively −28.56°<φv<0.0° and −30.0°<φh<30.0° that are obtained from Equations 2 to 9 described above.

For example, in the case of a large-sized freight vehicle with a total vehicle weight of 8.0 tons or more, it is desirable to be able to confirm more regions. Thus, it is desirable that the driver be able to confirm a specified region of d0=1.0 m, d1=4 m, d2=30 m, d3=1.5 m, d4=10 m, d5=1 m, d6=1.75 m, d7=2 m, d8=12 m, w1=1 m, w2=5 m, w3=4.5 m, w4=15 m, w5=2 m, w6=2 m, w7=2 m, and w8=3 m, that are obtained similarly, visually or using a mirror or a display device.

A specific example in which the camera unit 11 in the first embodiment includes this region in an imaging region will be described. For example, a camera unit having a vertical angle of view θv and a horizontal angle of view θh being 23.6 degrees and a vertical angle of view θlv and a horizontal angle of view θlh being 66.4 degrees in the high resolution region 10a is used. Then, it is only required that the camera unit is installed at a position of x=1.2 m, z=0.3 m, and h=2.3 m so that an angle φv in the vertical direction of the optical axis of the camera unit is set to −23.6°<φv<0.0° obtained from Equations 2, 3, 6, 7, and 10 described above.

Since it is desirable that the horizontal direction in the left direction be included in an angle of view in order to image the backward of the side surface at a wide angle, it is desirable that the camera unit be installed such that the angle φh in the horizontal direction of the optical axis of the camera unit is set to −23.6°<φh<0° obtained from Equations 4, 8, 9 and 10 described above.

In the above-described numerical example, conditions for an angle of the optical axis of the camera unit in that case have been calculated with the installation position (x, z, h) of the camera unit as a fixed condition, but it is only required that the conditions of Equations 2 and 3 are satisfied, and a method of calculating the installation conditions is not limited thereto. For example, when an angle of the optical axis of the camera unit is determined in advance as a vehicle design constraint, the range of an installation position of the camera unit which satisfies the conditions of Equations 2 and 3 is determined based on this.

Thereby, the specified region can be included in the imaging range of the high resolution region of the camera unit. Similarly, when the installation position (x, z, h) of the camera unit and the angle of the optical axis of the camera unit are determined in advance, the vertical angle of view θv and the horizontal angle of view θh of the high resolution region 10a of the camera unit which satisfies the conditions of Equations 2 and 3 may be determined based on this. As described above, a single camera can capture images of a plurality of specified regions and can also capture images in two or more horizontal directions with high resolution.

Second Embodiment

Figure 12:
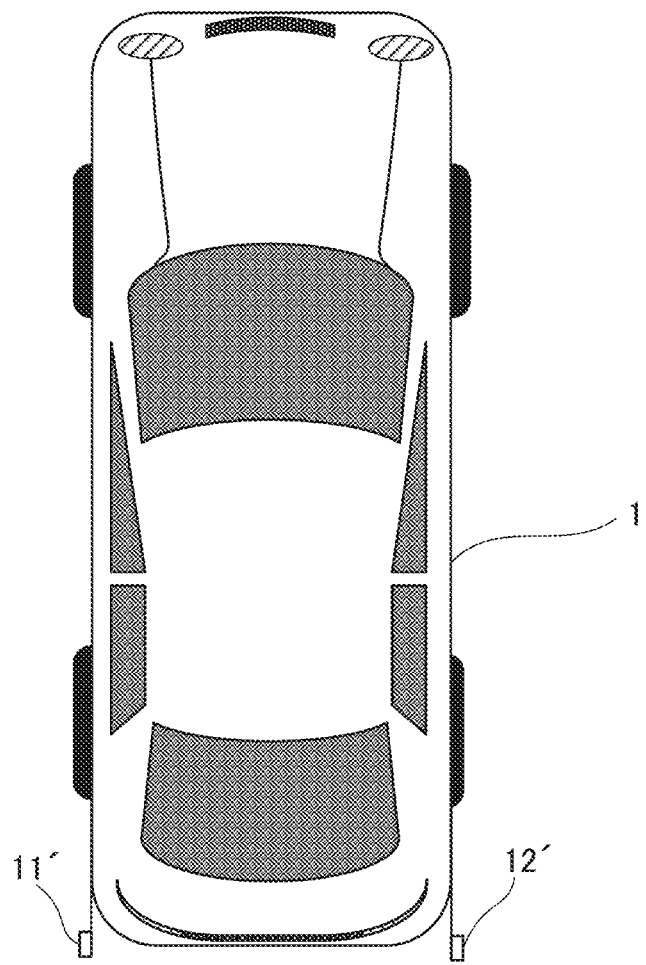
FIG. 12 is a diagram illustrating a positional relationship between a camera unit and a vehicle in a second embodiment.

FIG. 12 is a diagram illustrating a positional relationship between a camera unit and a vehicle in a second embodiment. In the second embodiment, a camera unit having optical characteristics as illustrated in FIG. 2 is installed at the rear corner of a vehicle 1 as illustrated in FIG. 12.

In the second embodiment, description is given of an installation method for a camera that can capture images in a plurality of required imaging ranges and high resolution imaging directions with fewer cameras than the number of directions required for high resolution imaging when the backward and lateral sides are imaged. Description of the portions that have been already described in the first embodiment is omitted.

First, installation conditions under which a camera unit 11' as a second imaging device installed at the rear corner of the vehicle 1 can image a specified region region1 behind the vehicle side surface in the same manner as in the first embodiment will be described. It is assumed that the camera unit 11' has substantially the same optical system, imaging device characteristics, and the like as those of the camera unit 11 described in the first embodiment.

That is, the second imaging device includes an optical system that forms an optical image, which has a low resolution region near the optical axis and a high resolution region outside a low resolution region, on a light receiving surface of an imaging element. Although an offset x between the camera unit 11 and the viewpoint position E of the driver is different, the same installation conditions can be used.

That is, since the distance of a specified region behind the vehicle side surface extends to infinity behind the vehicle, the camera unit is installed to be able to capture an image of infinity, that is, in a horizontal direction with a width w2. In order to confirm an object far away from the driver with a video captured by the camera, it is desirable that the camera unit be installed to be able to capture images from the nearby ground to the horizontal direction with high resolution.

The camera unit 11' is installed such that a region w1 separated from the viewpoint position E by d1 in addition to Equation 2 is included in an imaging angle of view so that the specified region region1 on the vehicle side surface is included in the angle of view of the camera unit 11'. Thus, it is desirable that the camera unit be installed to satisfy a condition 1 (Equations 2 and 3) as an installation example.

That is, an image is captured in the horizontal backward direction of one side surface of the vehicle 1 in the high resolution region of the optical system, and thus the camera unit 11' can capture an image in the horizontal direction with high resolution while imaging the specified region region1 on the side surface of the vehicle 1 in FIG. 5.

The installation conditions under which the camera unit 11' can capture an image in the horizontal direction with high resolution for display for a backward CTA will be described in detail. In the display for the backward CTA, it is required to be able to confirm an object approaching from a distant region in the right or the left direction at an intersection with poor visibility, and the camera unit 11' is required to be installed to be able to confirm the right or the left horizontal direction behind the viewpoint position E (driver's seat) of the driver.

Since distant regions in the right or the left horizontal direction continue to infinity, it is desirable to install the camera unit so that it can image nearby objects in the horizontal direction with high resolution. An example of an installation condition (Equations 4 and 5) under which the camera unit 11' can capture an image in at least one of the right or the left horizontal direction behind the driver's viewpoint position E will be described.

A case where the camera unit 11' is located behind the viewpoint position E (x<0) is considered. In this case, the camera unit 11' is installed such that the high resolution regions 10a in the right or the left direction (($\varphi h - \theta h - \theta lh$) to ($\varphi h - \theta lh$) in the right direction when facing the front of the vehicle, ($\varphi h + \theta lh$) to ($\varphi h + \theta h + \theta lh$) in the left direction when facing the front of the vehicle) includes the right or the left horizontal direction.

When the camera unit 11' is located ahead the viewpoint position E (x 0), the camera unit 11' is installed such that a horizontal region behind the viewpoint position E is included in the high resolution region. With such installation, the camera unit 11' can image either one of the side surfaces of the vehicle in the horizontal direction with high resolution.

It is desirable that the camera unit 11' be disposed at a position where the vehicle 1 is not imaged centering on the optical axis in order to image the backward of the vehicle in the right or the left direction and to image the backward of the side surface of the vehicle. For example, it is desirable that an offset x of the camera unit be larger than the tip end of the rear surface of the vehicle 1 in order to image the backward of the vehicle in the right or the left direction. Further, in order to image the backward of the side of the vehicle, it is desirable that an offset z of the camera unit 11' be installed outside the side of the vehicle 1 (−Z direction in FIG. 4).

By satisfying the conditions of Equations 2 and 3 and Equation 4 or Equation 5 as described above, either one of the backward of the side surface of the vehicle 1 and the right or the left direction can be included in the imaging angle of view. Further, it is desirable to satisfy the following fourth condition for including a downward direction behind the vehicle 1 within the imaging angle of view, in addition to the first condition of Equations 2 and 3 and the second condition of Equations 4 and 5 described above.

However, the second embodiment may satisfy any one of the first condition, the second condition, and the fourth condition.

Figure 13:
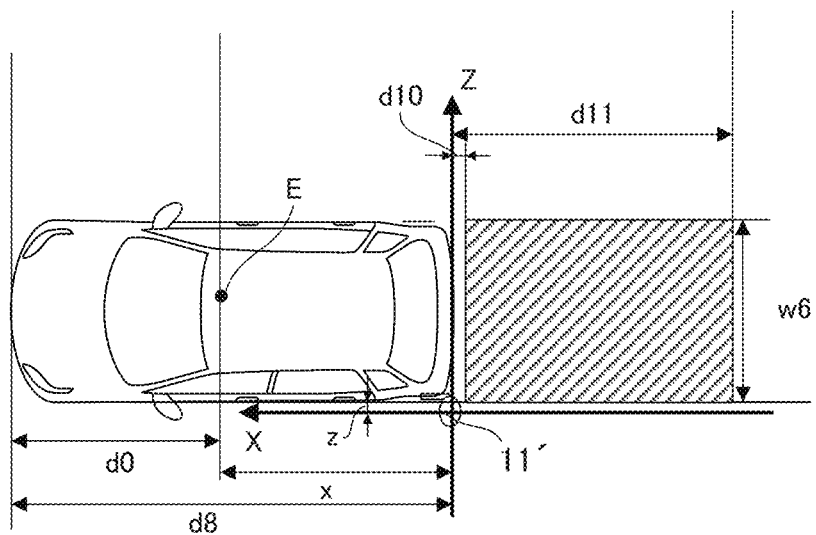
FIG. 13 is a plan view of the vehicle 1 when viewed from above, the plan view illustrating a specified region below the front surface of the vehicle in the second embodiment.

An imaging region (a specified region below the backward surface of the vehicle) necessary for display for a lower backward side which is used for a backward monitoring device will be described using FIG. 13. FIG. 13 is a plan view of the vehicle 1 when viewed from above, the plan view illustrating a specified region below the front surface of the vehicle in the second embodiment.

The X, Y, and Z directions and angles in FIG. 13 correspond to those in FIGS. 4A and 4B and FIG. 5, respectively, and have the same relationship. E illustrated in FIG. 13 is the same as E illustrated in FIG. 4A and FIG. 5, and represents the driver's viewpoint position.

A positional relationship (x, h1, z) between the camera unit 11' and the vehicle 1 illustrated in FIG. 13 and a relationship between the optical axis and the imaging angle of view ($\varphi v$, $\theta v$, $\theta lv$, $\varphi h$, $\theta h$, $\theta lh$) are also the same relationships as those illustrated in FIGS. 4A and 4B. d8 in FIG. 13 is the length (vehicle length) of the vehicle 1.

Here, a specified region below the backward surface of the vehicle will be described with reference to FIG. 13. The specified region below the backward surface of the vehicle is a region that needs to be confirmed by the driver with a display device when the vehicle is backing up, and it is assumed that d11 is a distance from a predetermined position on the front side to be confirmed, which is away from the backward surface of the vehicle by d10, to a predetermined distant position to be confirmed, and w6 is the vehicle width of the vehicle 1.

In this case, the specified region below the backward surface of the vehicle is a region represented by a region on the ground surrounded by d11 and w6, and it is desirable that the camera unit 11' be able to image an object with a height h3 within a predetermined specified region to be confirmed behind the vehicle 1.

Thus, the installation condition (fourth condition) under which the camera unit 11' can image the specified region below the backward surface of the vehicle is a condition that a region surrounded by d11, w6, and the height h3 is included in the imaging angle of view of the camera unit 11'.

That is, the camera unit 11' is installed to satisfy the following installation conditions (Equation 11, Equation 12, Equation 14) or installation conditions (Equation 11, Equation 13, and Equation 15) so that the above-described region is included within the imaging angle of view ($\varphi v - \theta v - \theta l v$) to ($\varphi v + \theta v + \theta l v$) of the camera unit 11'. Note that z is a distance between the installation position (second installation position) of the camera unit 11' and the side surface of the vehicle.

$$\varphi v - \theta v - \theta l v \leq -A \tan((d8 - d0 - x + d10)/h1) \leq \varphi v + \theta v + \theta l v \quad \text{(Equation 11)}$$

(when $h1 \geq h3$)

$$\varphi v - \theta v - \theta l v \leq -A \tan((d8 - d0 - x + d11)/(h1 - h3)) \leq \varphi v + \theta v + \theta l v \quad \text{(Equation 12)}$$

(when $h1 < h3$)

$$\varphi v - \theta v - \theta l v \leq -A \tan((h3 - h1)/(d8 - d0 - x + d11)) - 90° \leq \varphi v + \theta v + \theta l v \quad \text{(Equation 13)}$$

(when $h1 \geq h3$)

$$\varphi h - \theta h - \theta l h \leq A \tan((w6 + z)/(h1 - h3)) \leq \varphi h + \theta h + 0 l h \quad \text{(Equation 14)}$$

(when $h1 < h3$)

$$\varphi h - \theta h - \theta l h \leq A \tan((h3 - h1)/(w6 + z)) + 90° \leq \varphi h + \theta h + \theta l h \quad \text{(Equation 15)}$$

With such installation, the camera unit 11' can appropriately image the specified region in a downward direction behind the vehicle. Particularly, in a large-sized vehicle, it is necessary to detect a moving object at the side of the passenger seat of the vehicle and image a detection region for a side collision warning to be given to the driver when there is a possibility of collision.

The detection region is a region where there is a high possibility of trapping or a collision in a case where there is an object in the detection region, for example, when the host vehicle is turning left. The camera unit 11 disposed on the side of the passenger seat can also cope with an installation condition for detecting a moving object on the side of the passenger seat by installing the camera unit 11 so that the detection region is included within the imaging range.

A relationship between the specified region at the side on the passenger seat side of the vehicle, the detection region, and the object is the same as those in FIGS. 10 and 11. Here, description is given of an installation condition under which the camera unit 11' can capture images with a range having a width w5 and distance d5 illustrated in FIGS. 6 and 8 under the side of the passenger seat of the vehicle as a specified region.

For example, it is desirable to satisfy the following installation condition (Equation 16) so that the above-described region is included in an imaging angle of view ($\varphi v - \theta v - \theta l v$ to $\varphi v + \theta v + \theta l v$) of the camera unit 11', in addition to Equations 8 and 10.

$$v - \theta v - \theta l v \leq A \tan((x + d5)/h1) \leq \varphi v + \theta v + \theta l v \quad \text{(Equation 16)}$$

Since it is necessary to display a video of a distant region behind the vehicle on a display unit in order for the driver to confirm the backward of the vehicle using an electronic rearview mirror, it is desirable to image a specified region behind the vehicle in a high resolution region so as to be able to confirm a distant region.

Figure 14:
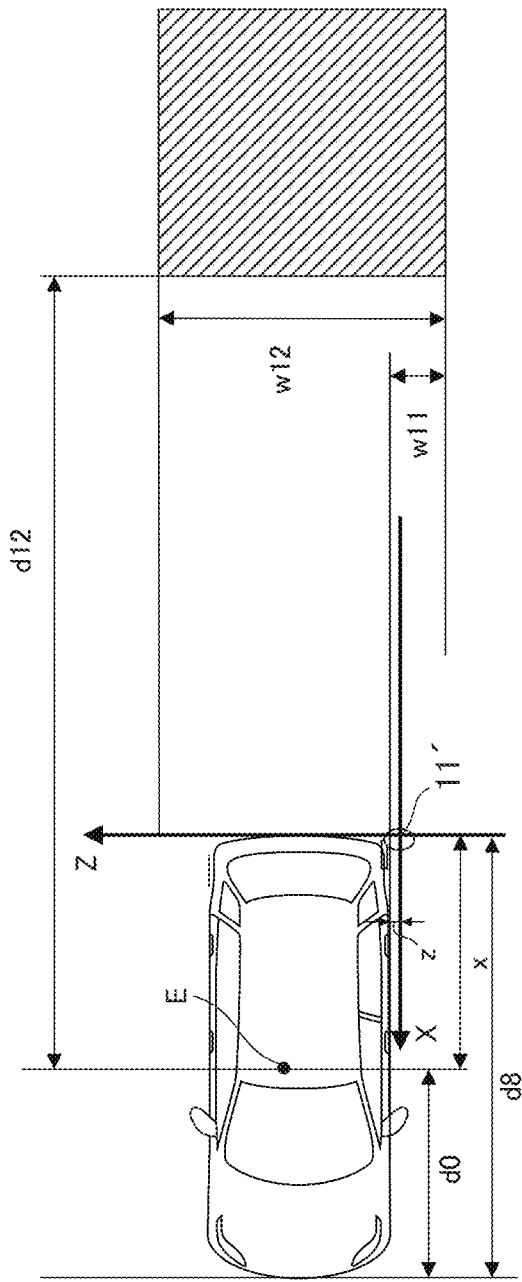
FIG. 14 is a diagram illustrating a specified region behind the vehicle in the second embodiment.

FIG. 14 is a diagram illustrating a specified region behind a vehicle in the second embodiment, and the specified region behind the vehicle is a range having a width w12 and a distance d12 as illustrated in FIG. 14. A width from the side surface of the vehicle to the specified region is defined as w11. Installation conditions under which the camera unit 11' can capture images will be described.

In order to image the specified region, it is desirable to satisfy an installation condition (Equations 17 and 18) so that, for example, the above-described region is included within the imaging angle of view ($\varphi v - \theta v - \theta l v$) to ($\varphi v + \theta v + \theta l v$) of the camera unit 11'.

$$\varphi v - \theta v - \theta l v \leq -A \tan((d12 - x)/h1) \leq \varphi v - \theta l v \quad \text{(Equation 17)}$$

$$\varphi h - \theta h - \theta l h \leq A \tan((w12 - w11 - z)/h1) \leq \varphi h + \theta h + \theta l h \quad \text{(Equation 18)}$$

The installation conditions for the camera unit 11' have been described above. In order to capture images in a plurality of required imaging ranges and high resolution imaging directions with a smaller number of cameras than the number of directions required for high resolution imaging, it is desirable that the camera unit 11' be disposed diagonally behind and outside the corner behind the passenger seat side.

The installation conditions for the camera unit 11' on the passenger seat side have been described above. A camera unit 12' disposed on the driver's seat side is also disposed under the same installation conditions, and thus images can be captured in a plurality of required imaging ranges and high resolution imaging directions on the driver's seat side with a smaller number of cameras than the number of directions required for high resolution imaging. It is desirable that the camera unit 12' be also disposed diagonally behind and outside the corner behind the driver's seat side.

Actual specific numerical values for the camera unit 11' on the passenger seat side will be described below. For example, in the case of a passenger car with nine passengers or less or a small freight vehicle (for example, a vehicle weight of 3.5 tons or less), it is desirable that the driver be able to confirm a specified region in which d0=0.9 m, d1=4, d2=20 m, d8=4.8 m, d10=0.3 m, d11=3.5 m, d12=60 m, w1=1 m, w2=4 m, w5=0.3 m, w6=1.8 m, w11=9 m, w12=20 m by using an electronic side mirror.

In this case, for example, when a camera unit having a vertical angle of view $\theta v$ and a horizontal angle of view $\theta h$ of 23.6 degrees and a vertical angle of view $\theta l v$ and a horizontal angle of view $\theta l h$ of 66.4 degrees in the high resolution region 10a is used and installed at a position where x=3 m, z=0.3 m, and h=1.4 m, an angle $\varphi v$ in the vertical direction and an angle $\varphi h$ in the horizontal direction of the optical axis of the camera unit are respectively 22.2°<$\varphi v$<0° and −7.06°<$\varphi h$<9.14° obtained from Equations 2 to 5 and Equations 11 to 18 described above.

For example, in the case of a large-sized freight vehicle with a total vehicle weight of 8.0 tons or more, it is desirable to be able to confirm more regions. Thus, it is desirable that the driver be able to confirm a specified region of d0=1 m, d1=4 m, d3=1.5 m, d4=10 m, d5=1 m, d6=1.75 m, d7=2 m, d8=12 m, d10=0.3 m, d11=3.5 m, d12=60 m, w1=1 m, w2=5 m, w3=4.5 m, w4=15 m, w5=2 m, w8=3 m, w6=2 m, w11=9 m, and w12=20 m using an electronic side mirror.

In this case, it is assumed that a camera unit having a vertical angle of view θv and a horizontal angle of view θh being 23.6 degrees and a vertical angle of view θlv and a horizontal angle of view θlh being 66.4 degrees in the high resolution region 10a is used and installed at a position where x=12 m, z=0.2 m, and h=2 m. Then, an angle φv in the vertical direction of the optical axis of the camera unit is −8.75°<φv<0° obtained by Equations 2, 3, 10, 11, 12, 13, 16, and 17 described above.

Since it is desirable that the horizontal direction in the left direction be included in an angle of view in order to image the backward of the side surface at a wide angle, the angle φh in the horizontal direction of the optical axis of the camera unit is set to −9.87°<φh<0° obtained by Equations 4, 8, 10. 14, 15, and 18 described above.

In the above-described numerical example, conditions for an angle of the optical axis of the camera unit in that case have been calculated with the installation position (x, z, h) of the camera unit as a fixed condition, but it is only required that the conditions of Equations 2 and 3 are satisfied, and a method of calculating the installation conditions is not limited thereto. For example, when an angle of the optical axis of the camera unit is determined in advance as a vehicle design constraint, the range of an installation position of the camera unit which satisfies the conditions of Equations 2 and 3 is determined based on this.

Thereby, the specified region can be included in the imaging range of the high resolution region of the camera unit. Similarly, when the installation position (x, z, h) of the camera unit and the angle of the optical axis of the camera unit are determined in advance, the vertical angle of view θv and the horizontal angle of view θh of the high resolution region 10a of the camera unit which satisfies the conditions of Equations 2 and 3 may be determined based on this.

As described above, also in the second embodiment, a single camera can capture images of a plurality of specified regions and can also capture images in two or more horizontal directions with high resolution. In the second embodiment, a case where the camera unit having the optical characteristics as illustrated in FIG. 2 is disposed at the second installation position at the rear has been described, but camera unit may be combined with a camera unit disposed at the front as in the first embodiment.

That is, for example, a total of four camera units including two camera units at both front corners and two camera units at both rear corners when the vehicle 1 is viewed from above may be disposed. Alternatively, for example, a total of two camera units including one camera unit at the front corner on the passenger seat side and one camera unit at the rear corner on the driver's seat side, which is a diagonal position, may be installed. Alternatively, two camera units may be disposed at the front corner, and one camera unit may be disposed at the rear corner, or one camera unit may be disposed at the front corner, and two camera units may be disposed at the rear corner.

At least a portion of the information processing system of the embodiment may or may not be mounted on a movable apparatus such as a vehicle. The present invention can be applied to a case where a movable apparatus is remotely controlled.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the movable apparatus through a network or various storage media. Then, a computer (or a CPU, an MPU, or the like) of the movable apparatus may be configured to read and execute the program. in such a case, the program and the storage medium storing the program configure the present invention.

The present invention includes, for example, realizing the functions of the embodiments explained above by using at least one processor or circuit. A plurality of processors may be used for distributed processing.

This application claims the benefit of Japanese patent application no. 2022-157151, filed on Sep. 29, 2022, which is hereby incorporated by reference herein in its entirety.

What is claimed is:

1. A movable apparatus comprising:
a first imaging device including an optical system that forms an optical image, which has a low resolution region near an optical axis and a high resolution region outside the low resolution region, on a light receiving surface of an imaging element,
wherein the first imaging device is installed at a first installation position where an image is captured in at least one of a horizontal backward direction of one side surface of the movable apparatus, right or left direction in a horizontal direction ahead of a driver's seat of the movable apparatus, and a downward direction ahead of the movable apparatus in the high resolution region of the optical system,
wherein, when the image height of the optical system is y, f is a focal distance of the optical system, and θ is a half angle of view, a projection characteristic y(θ) satisfies the following condition of $0.2 < 2*f \tan(\theta \max/2)/y(\theta \max) < 0.92$.

2. The movable apparatus according to claim 1, wherein the optical system has a projection characteristic in which an image height with respect to an angle of view per unit is higher at an angle of view in the high resolution region than at an angle of view in the low resolution region near the optical axis.

3. The movable apparatus according to claim 1, wherein an optical axis direction of the optical system is downward from the first installation position.

4. The movable apparatus according to claim 1, wherein the one side surface of the movable apparatus is a side surface on a passenger seat side of the movable apparatus.

5. The movable apparatus according to claim 1, wherein, when an angle in an optical axis direction from a vertical direction when the movable apparatus is viewed from the side surface is pv, an angle of view of the high resolution region is Ov, an angle of view of the low resolution region is θlv, a predetermined distance from a driver's viewpoint position to a backward side is dl, a distance between the viewpoint position and the first installation position is x, and a height of the first installation position is hi, the following equations are satisfied $$\varphi v - \theta v - \theta l v < -90° < \varphi v - \theta l v$$

$$\varphi v - \theta v - \theta l v \leq -A \tan((x+d1)/h1) \leq \varphi v + \theta v + \theta l v.$$

6. The movable apparatus according to claim 1, wherein, when an angle in an optical axis direction from a vertical direction when the movable apparatus is viewed from the front is ph, an angle of view of the high-resolution region is Oh, and an angle of view of the low-resolution region is θlh, the following equations are satisfied $$\varphi h - \theta h - \theta lh \leq -90° \leq \varphi h - \theta lh.$$

7. The movable apparatus according to claim 1, wherein, when an angle in an optical axis direction from a vertical direction when the movable apparatus is viewed from the side surface is φv, an angle of view of the high resolution region is θv, an angle of view of the low resolution region is θlv, a predetermined distance from a driver's viewpoint position to a backward side is dl, a distance between the viewpoint position and the first installation position is x, a height of the first installation position is hi, a distance between the viewpoint position and a tip end of the movable apparatus is d0, and a distance from the tip end of the movable apparatus to a predetermined front lower position to be confirmed is d7, the following equations are satisfied $$\varphi v - \theta v - \theta lv \leq -A \tan((x-d0)/h1) \leq \varphi v + \theta v + \theta lv$$

$$\varphi v - \theta v - \theta lv \leq A \tan((d0+d7-x)/h1) \leq \varphi v^* \theta v + \theta lv.$$

8. The movable apparatus according to claim 7, wherein, when a vehicle width of the movable apparatus is w6, a distance to be confirmed at the side of the movable apparatus is w7, and a distance between the first installation position and the side surface of the movable apparatus is z, the following equations are satisfied $$\varphi h - \theta h - \theta lh \leq -A \tan((w6+z)/h1) \leq \varphi h + \theta h + \theta lh$$

$$\varphi h - \theta h - \theta lh \leq A \tan(w7-z)/h1) \leq \varphi h + \theta h + \theta lh.$$

9. The movable apparatus according to claim 1, wherein a second imaging device having the same characteristics as the first imaging device is disposed at a second installation position diagonally opposite to the first installation position when the movable apparatus is viewed from above, and
   an image is captured in at least one of a horizontal direction behind one side surface of the movable apparatus, one of right and left direction in a horizontal direction behind the driver's seat of the movable apparatus, and a downward direction behind the movable apparatus in the high resolution region of the optical system.

10. The movable apparatus according to claim 9, wherein, for the second imaging device, when an angle in an optical axis direction from a vertical direction when the movable apparatus is viewed from the side surface is pv, an angle of view of the high resolution region is Ov, an angle of view of the low resolution region is θlv, a distance between a driver's viewpoint position and the second installation position is x, a height of the second installation position is hi, a distance from the viewpoint position and a tip end of the movable apparatus is d0, a length of the movable apparatus is d8, a distance from the movable apparatus to a predetermined position on the front side to be confirmed behind the movable apparatus is d10, a distance from the movable apparatus to a predetermined distant position to be confirmed behind the movable apparatus is d11 a width of the movable apparatus is w6, a height of an object to be confirmed behind the movable apparatus is h3, and a distance between the second installation position and the side surface of the movable apparatus is z, the following equations are satisfied $$\varphi v - \theta v - \theta lv \leq -A \tan((d8-d0-x+d10)/h1) \leq \varphi v + \theta v + \theta lv$$

(when $h1 \geq h3$)

$$\varphi v - \theta v - \theta lv \leq -A \tan((d8-d0-x+d11)/(h1-h3)) \leq \varphi v + \theta v + \theta lv$$

(when $h1 < h3$)

$$\varphi v - \theta v - \theta lv \leq -A \tan((h3-h1)/(d8-d0-x+d11)) - 90° \leq \varphi v + \theta v + \theta lv$$

(when $h1 \geq h3$)

$$\varphi h - \theta h - \theta lh \leq A \tan((w6+z)/(h1-h3)) \leq \varphi h + \theta h + \theta lh$$

(when $h1 < h3$)

$$\varphi h - \theta h - \theta lh \leq A \tan((h3-h1)/(w6+z)) + 90° \leq \varphi h + \theta h + \theta lh.$$

11. A movable apparatus comprising:
   a first imaging device including an optical system that forms an optical image, which has a low resolution region near an optical axis and a high resolution region outside the low resolution region, on a light receiving surface of an imaging element,
   wherein the high resolution region of the optical system is installed at a first installation position that satisfies at least one of the following first, second, and third conditions,
   the first condition being a condition that the following equations are satisfied $$\varphi v - \theta v - \theta lv < -90° < \varphi v - \theta lv$$

$$\varphi v - \theta v - \theta lv \leq -A \tan((x+d1)/h1) \leq \varphi v + \theta v + \theta lv$$

when an angle in an optical axis direction from a vertical direction when the movable apparatus is viewed from the side surface is φv, an angle of view of the high resolution region is θv, an angle of view of the low resolution region is θlv, a predetermined distance from a driver's viewpoint position to a backward side is d1, a distance between the viewpoint position and the first installation position is x, and a height of the first installation position is h1,
   the second condition is a condition that satisfies the following equations $$\varphi h - \theta h - \theta lh \leq -90° \leq \varphi h - \theta lh$$

$$\varphi h + \theta lh \leq 90° \leq \varphi h + \theta h + \theta lh$$

when an angle in an optical axis direction from a vertical direction when the movable apparatus is viewed from the front is φh, an angle of view of the high resolution region is θh, and an angle of view of the low resolution region is θlh, and
   the third condition is a condition that satisfies the following equations $$\varphi v - \theta v - \theta lv \leq -A \tan((x-d0)/h1) \leq \varphi v + \theta v + \theta lv$$

$$\varphi v - \theta v - \theta lv \leq A \tan((d0+d7-x)/h1) \leq \varphi v + \theta v + \theta lv$$

when a distance between the viewpoint position and a tip end of the movable apparatus is d0, and a distance from the tip end of the movable apparatus to a predetermined front lower position to be confirmed is d7.

12. A movable apparatus comprising: a first imaging device including an optical system that forms an optical image, which has a low resolution region near an optical axis and a high resolution region outside the low resolution region, on a light receiving surface of an imaging element, wherein the first imaging device is installed at a first installation position where an image is captured in at least one of a horizontal backward direction of one side surface of the movable apparatus, right or left direction in a horizontal direction ahead of a driver's seat of the movable apparatus, and a downward direction ahead of the movable apparatus in the high resolution region of the optical system, and wherein, when an angle in an optical axis direction from a vertical direction when the movable apparatus is viewed from the side surface is pv, an angle of view of the high resolution θv−θlv≤−θlv−θv region is Ov, an angle of view of the low resolution region is Olv, a predetermined distance from a driver's viewpoint position to a backward side is dl, a distance between the viewpoint position and the first installation position is x, and a height of the first installation position is hi, the following equations are satisfied $$\varphi v - \theta v - \theta l v < -90° < \varphi v - \theta l v$$

$$\varphi v - \theta v - \theta l v \leq -A\tan((x+d1)/h1) \leq \varphi v + \theta v + \theta l v.$$

13. A movable apparatus comprising: a first imaging device including an optical system that forms an optical image, which has a low resolution region near an optical axis and a high resolution region outside the low resolution region, on a light receiving surface of an imaging element, wherein the first imaging device is installed at a first installation position where an image is captured in at least one of a horizontal backward direction of one side surface of the movable apparatus, right or left direction in a horizontal direction ahead of a driver's seat of the movable apparatus, and a downward direction ahead of the movable apparatus in the high resolution region of the optical system, and wherein, when an angle in an optical axis direction from a vertical direction when the movable apparatus is viewed from the front is ph, an angle of view of the high resolution region is Oh, and an angle of view of the low resolution region is 61h, the following equations are satisfied $$\varphi h - \theta h - \theta l h \leq -90° \leq \varphi h - \theta l h$$

$$\varphi h + \theta l h \leq 90° \leq \varphi h + \theta h + \theta l h.$$

14. A movable apparatus comprising:
a first imaging device including an optical system that forms an optical image, which has a low resolution region near an optical axis and a high resolution region outside the low resolution region, on a light receiving surface of an imaging element,
wherein the first imaging device is installed at a first installation position where an image is captured in at least one of a horizontal backward direction of one side surface of the movable apparatus, right or left direction in a horizontal direction ahead of a driver's seat of the movable apparatus, and a downward direction ahead of the movable apparatus in the high resolution region of the optical system,
wherein a second imaging device having the same characteristics as the first imaging device is disposed at a second installation position diagonally opposite to the first installation position when the movable apparatus is viewed from above, and
wherein an image is captured in at least one of a horizontal direction behind one side surface of the movable apparatus, one of right and left direction in a horizontal direction behind the driver's seat of the movable apparatus, and a downward direction behind the movable apparatus in the high resolution region of the optical system.

* * * * *